United States Patent [19]

Hioki et al.

[11] Patent Number: 4,814,265

[45] Date of Patent: Mar. 21, 1989

[54] SILVER HALIDE PHOTOGRAPHIC LIGHT-SENSITIVE MATERIAL

[75] Inventors: Takanori Hioki; Haruo Takei, both of Minami-Ashigara, Japan

[73] Assignee: Fuji Photo Film Co., Ltd., Kanagawa, Japan

[21] Appl. No.: 160,984

[22] Filed: Feb. 26, 1988

[30] Foreign Application Priority Data

Feb. 27, 1987 [JP] Japan .................. 62-44868

[51] Int. Cl.$^4$ ................................ G03C 1/02
[52] U.S. Cl. ..................... 430/570; 430/591; 430/592; 430/593; 430/594
[58] Field of Search ............ 430/591, 592, 593, 594, 430/570

[56] References Cited

U.S. PATENT DOCUMENTS 4,548,886 10/1985 Katagiri et al. ............... 430/945
4,738,908 4/1988 Oguchi et al. ............... 430/945

FOREIGN PATENT DOCUMENTS 6311393 1/1988 Japan .

*Primary Examiner*—Paul R. Michl
*Assistant Examiner*—Thorl Chea
*Attorney, Agent, or Firm*—Sughrue, Mion, Zinn, Macpeak & Seas

[57] ABSTRACT

A silver halide photographic light-sensitive material containing at least one methine dye which consists of an azulene nucleus, at least one of 10 carbon atoms of which is replaced by chalcogen atom(s) or nitrogen atom(s), and further whose 7-membered ring part is substituted with a methine bond having at the terminal an auxochrome which forms a conjugated resonance chromophore together with $10\pi$ electron system of the nucleus is provided.

Silver halide photographic light-sensitive materials of the invention are spectrally sensitized in long wavelength region, and have improved photographic performances such as sharpness and color resolution.

11 Claims, No Drawings

SILVER HALIDE PHOTOGRAPHIC LIGHT-SENSITIVE MATERIAL

BACKGROUND OF THE INVENTION

1. Field of the Invention

This invention relates to a silver halide photographic light-sensitive material containing a methine dye which contains an azulene nucleus, at least one of 10 carbon atoms of which is replaced by chalcogen atom(s) (for example, oxygen atom(s), sulfur atom(s), selenium atom(s), tellurium atom(s) or the like) or nitrogen atom(s) (hereinafter referred to as a heteroazulene nucleus).

2. Description of the Prior Art

It is an important technique for extending light-sensitive region of silver halides and increasing sensitivity to give a silver halide light-sensitive material spectral sensitization region owing to various sensitizing dyes besides intrinsic sensitization region of silver halides by adding the sensitizing dyes.

It is also an important technique to add various dyes and thereby enhance sharpness and color resolution of a silver halide light-sensitive material.

However, there are very few examples where a methine dye wherein a so-called heteroazulene nucleus composes a $10\pi$ electron system resonance terminal auxochrome is used for such purposes. That is, only dyes which each consist of an azulene nucleus whose 1-position is replaced by an oxygen atom or a nitrogen atom and further whose 3-position is substituted with a methine bond having an auxochrome at the terminal have hitherto been disclosed in Japanese Patent Publication for Opposition Purpose (hereinafter referred to as "J.P. KOKOKU") Nos. 53-39137 and 55-47378.

SUMMARY OF THE INVENTION

Although various sensitizing dyes have hitherto been developed in order to give spectral sensitivity region, it is an important mission of researchers to further develop new sensitizing dyes for photography.

Further, although various filter dyes, dyes for antihalation, and the like are used in silver halide light-sensitive materials for the purpose of enhancement of sharpness and color resolution and the like, it is also an important mission of researchers to develop new dyes for these objects.

An object of the present invention is to provide silver halide photographic light-sensitive materials whose light-sensitivities are improved.

Another object of the invention is to provide silver halide photographic light-sensitive materials which are spectrally sensitized.

Another object of the invention is to provide direct positive silver halide photographic light-sensitive materials having high sensitivities.

Another object of the invention is to provide silver halide photographic light-sensitive materials containing dyes for coloring.

The above objects of the present invention have been attained by a silver halide photographic light-sensitive material containing at least one methine dye which consists of an azulene nucleus, at least one of 10 carbon atoms of which is replaced by chalcogen atom(s) (for example, oxygen atom(s), sulfur atom(s), selenium atom(s), tellurium atom(s) or the like) or nitrogen atom(s) (a heteroazulene nucleus), and further whose 7-membered ring part is substituted with a methine bond having at the terminal an auxochrome which forms a conjugated resonance chromophore together with $10\pi$ electron system of the nucleus.

DETAILED DESCRIPTION OF THE INVENTION

Such a methine dye exhibits stability of a level higher than that expected based on the number of methine groups in the chromophore, and exhibits absorption peak in relatively long wavelength. These advantages are attributable to existence of a heteroazulene nucleus in the dye.

Methine dyes used in the present invention each consist of a heteroazulene nucleus which is substituted with a methine bond having an auxochrome at the terminal. The $10\pi$ electron system and auxochrome of the heteroazulene nucleus are bound together through carbon atoms lying between them. As is seen from the bond through carbon atoms between the heteroazulene nucleus and the auxochrome, pattern of alternative single bond and double bond exists and each dye may be represented by two different formulae. These two formulae represent limit of different resonance states, and in these two formulae positions of the single bond and the double bond binding carbon atoms are exchanged. That is, the heteroazulene nucleus and the auxochrome form a conjugated resonance chromophore through the bond.

Generic chracteristics of dyes used in the present invention may be understood by taking synthesis of them into consideration. The heteroazulene nucleus used as a starting substance for synthesis of a dye of the present invention has positive charge, which activates at least one of nucleus carbon atoms of the heteroazulene nucleus or a methyl substituent there of as a reactive site. This activated nucleus carbon atom of the heteroazulene nucleus can be regarded as a carbocation in one resonance form. When the instant carbon atom is methyl-substituted, a carbanion is formed by deprotonization of the methyl substituent in one resonance form. A methine bond is formed from a carbocation (positive) or carbanion (negative) site of the heteroazulene nucleus.

Although there are many embodiments consistent with the above general explanation, the present invention will be explained by citing typical embodiments.

In a methine dye containing a heteroazulene nucleus as used in the present invention, preferred heteroazulene nucleus is an azulene nucleus, at least one of carbon atoms at the 1- and 3-positions of which is replaced by chalcogen atom(s) or nitrogen atom(s). Therefore, such a nucleus is explained below as a representative example.

Dyes of the present invention may be represented as alternative resonance forms as shown in the following general formula (I):

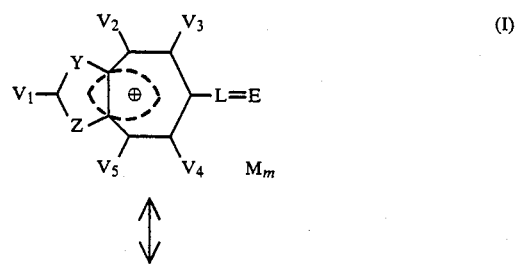

-continued

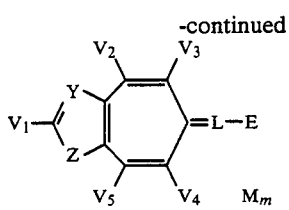

wherein E represents an auxochrome; L represents a methine bond; $V_1$, $V_2$, $V_3$, $V_4$ and $V_5$ each represent hydrogen atoms, halogen atoms, substituted or unsubstituted alkyl groups, acyl groups, acyloxy groups, substituted or unsubstituted alkoxycarbonyl groups, substituted or unsubstituted carbamoyl groups, substituted or unsubstituted sulfamoyl groups, carboxyl groups, cyano groups, hydroxyl groups, amino groups, acylamino groups, substituted or unsubstituted alkoxy groups, alkylthio groups, alkylsulfonyl groups, sulfonic groups, or aryl groups, or alternatively two of $V_1$ to $V_5$ linking to adjacent carbon atoms may combine to form a condensed ring.

Y and Z each represent carbon atoms

wherein V has the same meaning with $V_1$, $V_2$, $V_3$, $V_4$ and $V_5$), chalcogen atoms (for example, oxygen atoms, sulfur atoms, selenium atoms, tellurium atoms or the like) or nitrogen atoms

wherein $R_1$ is in some occasion necessary for forming a nucleus and in the other occasion unnecessary, and when needed, represents a hydrogen atom, a substituted or unsubstituted alkyl group, a substituted or unsubstituted aryl group or a heterocyclic ring group), provided that Y and Z do not represent carbon atoms at the same time. Further, when Y and Z are represented by chalcogen atoms or nitrogen atoms, at least one of them is a nitrogen atom. Further, when one of Y and Z represents a chalcogen atom, and the other represents a carbon atom or a nitrogen atom, Z represents a chalcogen atom and Y represents a carbon atom or a nitrogen atom.

M represents a counter ion for charge balance, m is the number of 0 or more necessary for balance of charge.

Bonding position of a methine bond L was representatively expressed as the 6-position in the formula (I), but may also be expressed as another position (4-, 5-, 7- or 8-position). However, preferred bonding positions of L are the 4-, 6- and 8-positions, particularly 4- and 6-positions.

The auxochrome E is detailedly explained below.

E may take an arbitrary general form found in methine dyes. Typically, the auxochrome is composed of nitrogen or chalcogen atoms, and resonates between a charged state and an uncharged state in the dye. E may take any form of auxochromes found, for example in cyanine, merocyanine, oxonol, pyrylium or thiapyrylium dyes. However, it is not necessary to restrict the auxochrome to such species. Though not so general, auxochromes composed of other atoms such as phosphorus or boron atoms may be mentioned. For example, 2-triphenylphosphoro-1,3-cyclopentadiene-5-yl may be mentioned.

Preferred dyes among those represented by the general formula (I) are those represented by the following general formulae (II) to (IX).

General formula (II)

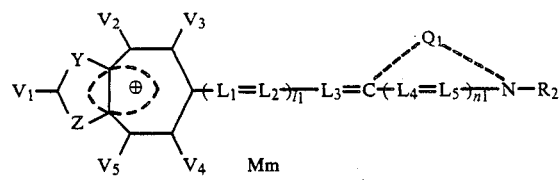

wherein
$V_1$ to $V_5$, Y, Z, M and m have the same meanings as those in the general formula (I); position of the methine bond may be any of the 4-, 5-, 6-, 7- and 8-positions, as is in the general formula (I);
$Q_1$ represents an atomic group necessary for forming a 5- or 6-membered nitrogen-containing ring; $L_1$, $L_2$, $L_3$, $L_4$ and $L_5$ each represent methine groups which may optionally be substituted;
$R_2$ represents a substituted or unsubstituted alkyl group; l represents an integer of 0 to 3; and $n_1$ represents 0 or 1.

General formula (III)

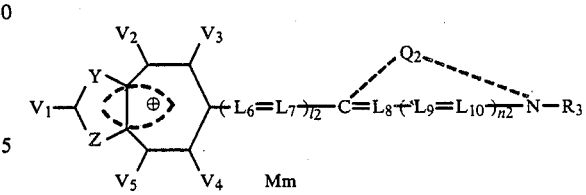

wherein
$V_1$ to $V_5$, Y, Z, M and m have the same meanings as those in the general formula (I); position of the methine bond may be any of the 4-, 5-, 6-, 7- and 8-positions, as is in the general formula (I);
$Q_2$ represents an atomic group necessary for forming a 5- or 6-membered nitrogen-containing ring; $L_6$, $L_7$, $L_8$, $L_9$ and $L_{10}$ have the same meanings with $L_1$, $L_2$, $L_3$, $L_4$ and $L_5$;
$R_3$ represents a substituted or unsubstituted alkyl group; $l_2$ represents an integer of 0 to 3; and $n_2$ represents 0 or 1.

General formula (IV)

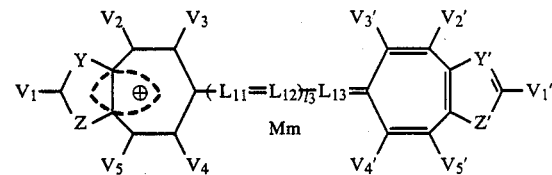

wherein
$V_1$ to $V_5$, Y, Z, M and m have the same meanings as those in the general formula (I); Y' and Z' have the same meanings with Y and Z, respectively; position of the methine bond may be any of the 4-, 5-, 6-, 7- and 8-positions;
$V_1'$ to $V_5'$ have the same meanings with $V_1$ to $V_5$, respectively; $L_{11}$, $L_{12}$ and $L_{13}$ have the same meanings with $L_1$, $L_2$, $L_3$, $L_4$ and $L_5$; and $l_3$ represents an integer of 0 to 3.

General formula (V)

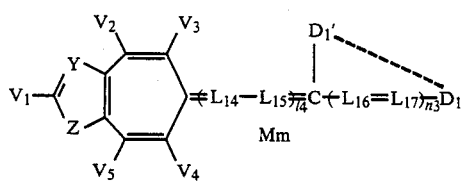

wherein $V_1$ to $V_5$, Y, Z, M and m have the same meanings as those in the general formula (I); position of the methine bond may be any of the 4-, 5-, 6-, 7- and 8-positions, as in the general formula (I);

$D_1$ and $D_1'$ each represent atomic groups necessary for forming an acidic nucleus, and may be a cyclic or cyclic;

$L_{14}$, $L_{15}$, $L_{16}$ and $L_{17}$ have the same meanings with $L_1$, $L_2$, $L_3$, $L_4$ and $L_5$; $l_4$ represents an integer of 0 to 3; and $n_3$ represents 0 or 1.

General formula (VI)

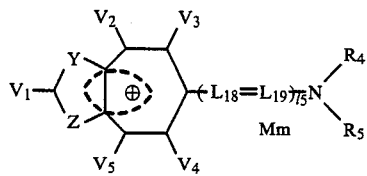

wherein $V_1$ to $V_5$, Y, Z, M and m have the same meanings as those in the general formula (I); position of the methine bond may be any of the 4-, 5-, 6-, 7- and 8-positions, as is in the general formula (I);

$R_4$ and $R_5$ represent substituents known in general tertiary amines, and $R_4$ and $R_5$ may combine to form a ring;

$L_{18}$ and $L_{19}$ have the same meanings with $L_1$, $L_2$, $L_3$, $L_4$ and $L_5$; and $l$ represents an integer of 0 to 3.

General formula (VII)

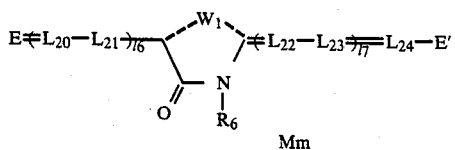

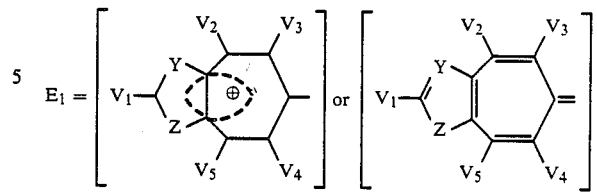

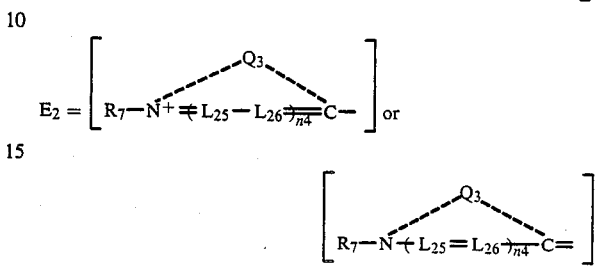

wherein

E and E' each is $E_1$ or $E_2$, provided that at least one of E and E' is $E_1$;

$V_1$ to $V_5$, Y, Z, M and m have the same meanings as those in the general formula (I); position of the methine bond in $E_1$ may be any of the 4-, 5-, 6-, 7- and 8-positions, as is in the general formula (I);

$W_1$ represents an atomic group necessary for forming a 5- or 6-membered heterocyclic ring;

$R_6$ represents a hydrogen atom, a substituted or unsubstituted alkyl group, a substituted or unsubstituted aryl group or a heterocyclic group;

$Q_3$ and $R_7$ have the same meanings with $Q_1$ and $R_2$ in the general formula (II), respectively;

$L_{20}$, $L_{21}$, $L_{22}$, $L_{23}$, $L_{24}$, $L_{25}$ and $L_{26}$ have the same meanings with $L_1$, $L_2$, $L_3$, $L_4$ and $L_5$;

$l_6$ and $l_7$ are intergers of 0 to 3; and $n_4$ is 0 or 1.

General formula (VIII)

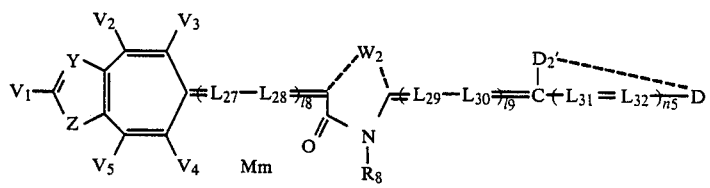

wherein $V_1$ to $V_5$, Y, Z, M and m have the same meanings as those in the general formula (I); position of the methine bond may be any of the 4-, 5-, 6-, 7- and 8-positions, as is in the general formula (I);

$W_2$ has the same meaning with $W_1$; $R_8$ has the same meaning with $R_6$;

$D_2$ and $D_2'$ have the same meanings with $D_1$ and $D_1'$ in the general formula (V), respectively;

$L_{27}$, $L_{28}$, $L_{29}$, $L_{30}$, $L_{31}$ and $L_{32}$ have the same meanings with $L_1$, $L_2$, $L_3$, $L_4$ and $L_5$;

$l_8$ and $l_9$ are integers of 0 to 3; and $n_5$ represents 0 or 1.

General formula (IXa)

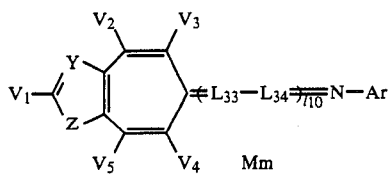

General formula (IXb)

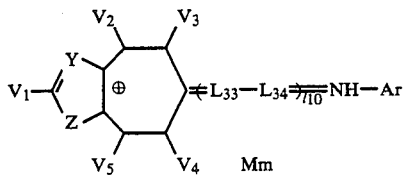

wherein
$V_1$ to $V_5$, Y, Z, M and m have the same meanings as those in the general formula (I), position of the methine bond may be any of the 4-, 5-, 6- and 8-positions, as is in the general formula (I);

$L_{33}$ and $L_{34}$ have the same meanings with $L_1$, $L_2$, $L_3$, $L_4$ and $L_5$;

Ar represents an aromatic group; and $l_{10}$ represents an integer of 0 to 3.

The general formulae (I) to (IX) are described below in detail.

Preferred examples of $R_1$ include a hydrogen atom; an unsubstituted aklyl group having 18 or less carbon atoms (for example, a methyl, ethyl, propyl, butyl, pentyl, octyl, decyl, dodecyl or octadecyl group or the like); a substituted alkyl gorup {an alkyl group having 18 or less carbon atoms as substituted with a carboxyl group, a sulfo group, a cyano group, halogen atom(s) (for example, fluorine, chlorine or bromine atoms or the like), a hydroxyl group, an alkoxycarbonyl group having 8 or less carbon atoms (for example, a methoxycarbonyl, ethoxycarbonyl, phenoxycarbonyl or benzyloxycarbonyl group or the like), an alkoxy group having 8 or less carbon atoms (for example, a methoxy, ethoxy, benzyloxy or phenethyloxy group or the like), a monocyclic aryloxy group having 10 or less carbon atoms (for example, a phenoxy or p-tolyloxy group or the like), an acyloxy group having 3 or less carbon atoms (for example, an acetyloxy or propionyloxy group or the like), an acyl group having 8 or less carbon atoms (for example, an acetyl, propionyl, benzoyl or mesyl group or the like), a substituted or unsubstituted carbamoyl group (for example, a carbamoyl, N,N-dimethylcarbamoyl, morpholinocarbonyl or piperidinocarbonyl group), a substituted or unsubstitited sulfamoyl group (for example, a sulfamoyl, N,N-dimethylsulfamoyl, morpholinosulfonyl or piperidinosulfonyl group), an substituted or unsubstituted aryl group having 10 or less carbon atoms (for example, a phenyl, 4-chlorophenyl, 4-methylphenyl or α-naphthyl group or the like), or the like}; an aryl group (for example, a phenyl or 2-naphthyl group or the like); a substituted aryl group (for example, a 4-carboxyphenyl, 4-sulfophenyl, 3-chlorophenyl or 3-methylphenyl group or the like); and a heterocyclic group (for example, a 2-pyridyl or 2-thiazolyl group or the like).

More preferably, $R_1$ is an unsubstituted alkyl group (for example, a methyl or ethyl group or the like) or a sulfoalkyl group (for example, a 2-sulfoethyl, 3-sulfopropyl or 4-sulfobutyl group or the like). Most preferably, $R_1$ is a methyl group.

A metal atom capable of forming a salt with $R_1$ is preferably an alkali metal, and an organic compound capable of forming a salt with $R_1$ is preferably a pyridine or an amine.

$V_1$, $V_2$, $V_3$, $V_4$, $V_5$, $V_1'$, $V_2'$, $V_3'$, $V_4'$ and $V_5'$ each are preferably hydrogen atoms, halogen atoms (for example, chlorine atoms, fluorine atoms, or bromine atoms), unsubstituted alkyl groups having 10 or less carbon atoms (for example, methyl or ethyl groups or the like), substituted alkyl groups having 18 or less carbon atoms (for example, benzyl, α-naphthylmethyl, 2-phenylethyl or trifluoromethyl groups), acyl groups having 10 or less carbon atoms (for example, acetyl, benzoyl or mesyl groups or the like), acyloxy groups having 10 or less carbon atoms (for example, acetyloxy groups or the like), substituted or unsubstituted alkoxycarbonyl groups (for example, methoxycarbonyl, ethoxycarbonyl or benzyloxycarbonyl groups or the like), substituted or unsubstituted carbamoyl groups (for example, carbamoyl, N,N-dimethylcarbamoyl, morpholinocarbonyl or piperidinocarbonyl groups or the like), substituted or unsubstituted sulfamoyl groups (for example, sulfamoyl, N,N-dimethylsulfamoyl, morpholinosulfonyl or piperidinosulfonyl groups or the like), carboxyl groups, cyano groups, hydroxyl groups, amino groups, acylamino groups having 8 or less carbon atoms (for example, acetylamino groups), substituted or unsubstituted alkoxy groups having 10 or less carbon atoms (for example, methoxy, ethoxy or benzyloxy groups or the like), alkylthio groups (for example, ethyl groups or the like), alkylsulfonyl groups (for exampls, methylsulfonyl groups or the like), sulfonic acid groups, or aryl groups (for example, phenyl or tolyl groups). Two of $V_1$ to $V_5$ which link to adjacent carbon atoms may combine to form a benzene ring or a heterocyclic ring (for example, a pyrrole ring, a thiophene ring, a furan ring, a pyridine ring, an imidazole ring, a triazole ring, a thiazole ring or the like).

Preferred $V_2$, $V_3$, $V_4$, $V_5$, $V_2'$, $V_3'$, $V_4'$ and $V_5'$ each are hydrogen atoms. Preferred $V_1$ and $V_1'$ each are hydrogen atoms, chlorine atoms, alkoxy groups (for example, methoxy groups or the like), alkylthio groups (for example, methylthio groups or the like) or aryl groups (for example, phenyl groups or the like).

When necessary for neutralizing ion charge of the dye, Mm is contained in the formula for exhibiting the presence or the absence of cation(s) or anion(s). It depends on the auxochrome and the substituent whether a dye is a cation or an anion or whether the dye has ion charge. The counter ion may readily be exchanged after preparation of the dye. Typical cations are an ammonium ion and alkali metal ions. The anion may specifically be an inorganic ion or an organic ion, and examples thereof include halide anions (for example, fluoride, chloride and iodide and the like), substituted arylsulfonate ions (for example, p-toluenesulfonate and p-chlorobenzenesulfonate ions and the like), aryldisulfonate ions (for example, 1,3-benzendisulfonate, 1,5-naphthalenedisulfonate and 2,6-naphthalenedisulfonate ions and the like), alkylsulfate ions (for example, a methylsulfate ion and the like), a sulfate ion, a thiocyanate ion, a perchlorate ion, a tetrafluoroborate ion, a picrate ion, an acetate ion, a trifluoromethanesulfonate ion, and the like. An iodide ion is preferred.

Examples of a nucleus formed containing $Q_1$ or $Q_2$ include a thiazole nucleus (for example, thiazole, 4- methylthiazole, 4-phenylthiazole, 4,5-dimethylthiazole, 4,5-diphenylthiazole or the like), a benzothiazole nucleus (for example, benzothiazole, 4-chlorobenzothiazole, 5-chlorobenzothiazole, 6-chlorobenzothiazole, 5-nitrobenzothiazole, 4-methylbenzothiazole, 5methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenethylbenzothiazole, 5-fluorobenzothiazole, 5-chloro-6-methylbenzothiazole, 5,6-dimethylbenzothiazole, 5,6-dimethoxybenzothiazole, 5-hydroxy-6-methylbenzothiazole, tetrahydrobenzothiazole, 4-phenylbenzothiazole or the like), a naphthothiazole nucleus (for example, naphtho(2,1-d)thiazole, naphtho(1,2-d)thiazole, naphtho(2,3-d)thiazole, 5-methoxynaphtho(1,2-d)thiazole, 7-ethoxynaphtho(2,1-d)thiazole, 8-methoxynaphtho(2,1-d)thiazole, 5-methoxynaphtho(2,3-d)thiazole or the like), a thiazoline nucleus (for example, thiazoline, 4-methylthiazoline, 4-nitrothiazoline or the like), an oxazole nucleus {an oxazole nucleus (for example, oxazole, 4-methyloxazole, 4-nitrooxazole, 5-methyloxazole, 4-phenyloxazole, 4,5-diphenyloxazole, 4-ethyloxazole or the like), a benzoxazole nucleus (for example, benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-nitrobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole or the like), a naphthoxazole nucleus (for example, naphtho(2,1-d)oxazole, naphtho(1,2-d)oxazole, naphtho(2,3-d)oxazole, 5-nitronaphtho(2,1-d)oxazole or the like) or the like}, an oxazoline nucleus (for example, 4,4-dimethyloxazoline or the like), a selenazole {a selenazole nucleus (for example, 4-methylselenazole, 4-nitroselenazole, 4-phenylselenazole or the like), a benzoselenazole nucleus (for example, benzoselenazole, 5-chlorobenzoselenazole, 5-nitrobenzoselenazole, 5-methoxybenzoselenazole, 5-hydroxybenzoselenazole, 6-nitrobenzoselenazole, 5-chloro-6-nitrobenzoselenazole, 5,6-dimethylbenzoselenazole or the like), a naphthoselenazole nucleus (for example, naphtho(2,1-d)selenazole, naphtho(1,2-d)selenazole or the like) or the like}, a selenazoline nucleus (for example, selenazoline, 4-methylselenazoline or the like), a tellurazole nucleus {a tellurazole nucleus (for example, tellurazole, 4-methyltellurazole, 4-phenyltellurazole or the like), a benzotellurazole nucleus (for example, benzotellurazole, 5-chlorobenzotellurazole, 5-methylbenzotellurazole, 5,6-dimethylbenzotellurazole, 6-methoxybenzotellurazole or the like), a naphthotellurazole nucleus (for example, naphtho(2,1-d)tellurazole, naphtho(1,2-d)tellurazole or the like) or the like}, a tellurazoline nucleus (for example, tellurazoline, 4-methyltellurazoline or the like), a 3,3-dialkylindolenine nucleus (for example, 3,3-dimethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolenine, 3,3,5-trimethylindolenine, 3,3,5-trimethyl-5-chloroindolenine or the like), an imidazole nucleus {an imidazole nucleus (for example 1-alkylimidazole, 1-arylimidazole, 1-alkyl-4-phenylimidazole or the like), a benzimidazole nucleus (for example, 1-alkylbenzimidazole, 1-alkyl-5-chlorobenzimidazole, 1-alkyl-5,6-dichlorobenzimidazole, 1-alkyl-5-methoxybenzimidazole, 1-alkyl-5-cyanobenzimidazole, 1-alkyl-5-fluorobenzimidazole, 1-alkyl-5-trifluoromethylbenzimidazole, 1-alkyl-6-chloro-5-cyanobenzimidazole, 1-alkyl-6-chloro-5-trifluoromethylbenzimidazole, 1-allyl-5,6-dichlorobenzimidazole, 1-allyl-5-chlorobenzimidazole, 1-arylbenzimidazole, 1-aryl-5-chlorobenzimidazole, 1-aryl-5,6-dichlorobenzimidazole, 1-aryl-5-methoxybenzimidazole, 1-aryl-5-cyanobenzimidazole or the like), a naphthimidazole nucleus (for example, 2-alkylnaphtho(1,2-d)imidazole, 1-arylnaphtho(1,2-d)imidazole or the like). In the above, each alkyl group is preferably one having 1 to 8 carbon atoms, for example an unsubstituted alkyl group such as a methyl, ethyl, propyl, isopropyl, butyl or the like, a hydroxyalkyl group (for example, 2-hydroxyethyl or 3-hydroxypropyl or the like) or the like. A methyl or ethyl group is particularly preferable. In the above, each aryl group represents phenyl, halogen (for example, chlorine)-substituted phenyl, alkyl (for example, methyl)-substituted phenyl, alkoxy (for example, methoxy)-substituted phenyl or the like.}, a pyridine nucleus (for example, 2-pyridine, 4-pyridine, 5-methyl-2-pyridine, 3-methyl-4-pyridine or the like), a quinoline nucleus {a quinoline nucleus (for example, 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 8-methoxy-4-quinoline, 6-methyl-4-quinoline, 6-methoxy-4-quinoline, 6-chloro-4-quinoline or the like), an isoquinoline nucleus (for example, 6-nitro-1-isoquinoline, 3,4-dihydro-1-isoquinoline, 6-nitro-3-isoquinoline or the like) or the like}, an imidazo(4,5-b)quinoxaline nucleus (for example, 1,3-diethylimidazo(4,5-b)quinoxaline, 6-chloro-1,3-diallylimidazo(4,5-b)quinoxaline or the like), an oxadiazole nucleus, a thiadiazole nucleus, a tetrazole nucleus, a pyrimidine nucleus and the like. A benzothiazole ring and a benzoxazole nuclei are preferable.

$R_2$, $R_3$ and $R_7$ each may take a form of a quaternary substituent of an arbitrary cyanine dye.

Preferred examples of each of $R_2$, $R_3$ and $R_7$ include an unsubstituted alkyl group having 18 or less carbon atoms (for example, a methyl, ethyl, propyl, butyl, pentyl, octyl, decyl, dodecyl or octadecyl group or the like), or a substituted alkyl group {preferably, an alkyl group having 18 or less carbon atoms as substituted, for example, with a carboxyl group, a sulfo group, a cyano group, halogen atom(s) (for example, fluorine, chlorine or bromine atom(s) or the like), a hydroxyl group, an alkoxycarbonyl group having 8 or less carbon atoms (for example, a methoxycarbonyl, ethoxycarbonyl, phenoxycarbonyl, or benzyloxycarbonyl group or the like), a substituted or unsubstituted alkoxy group having 8 or less carbon atoms (for example, a methoxy, ethoxy, benzyloxy or phenethyloxy group or the like), an aryloxy group having 10 or less carbon atoms (for example, a phenoxy or p-tolyloxy group or the like), an acyloxy group having 3 or less carbon atoms (for example, an acetyloxy, or propionyloxy group or the like), an acyl group having 8 or less carbon atoms (for example, an acetyl, propionyl, benzoyl or mesyl group or the like), a substituted or substituted carbamoyl group (for example, a carbamoyl, N,N-dimethylcarbamoyl, morpholinocarbonyl, or piperidinocarbonyl group or the like), a substituted or unsubstituted sulfamoyl group (for example, a sulfamoyl, N,N-dimethylsulfamoyl, morpholinosulfonyl or piperidinosulfonyl group or the like), a substituted or unsubstituted aryl group having 10 or less carbon atoms (for example, a phenyl, 4-chlorophenyl, 4-methylphenyl, or α-naphthyl group or the like), or the like}.

$D_1$ and $D_1'$, and $D_2$ and $D_2'$ each represent atomic groups necessary for forming an acidic nucleus as previously defined, and each may take a form of an acidic nucleus of various general merocyanine dyes. Preferably, $D_1$ and $D_2$ each are cyano, sulfo or carbonyl groups, and $D_1'$ and $D_2'$ each represent the remaining atomic groups necessary for forming an acidic nucleus.

When the acidic nucleus is non-cyclic, that is, when $D_1$ and $D_1'$, or $D_2$ and $D_2'$ are mutually independent groups, terminal of the methine bond is a group such as malononitrile, alkylsulfonylacetonitrile, cyanomethyl benzofuranyl ketone or cyanomethyl phenyl ketone.

$D_1$ and $D_1'$, or $D_2$ and $D_2'$ may also combine to form a 5- or 6-membered heterocyclic ring consisting of carbon, nitrogen and chalcogen (typically, oxygen, sulfur, selenium and tellurium) atoms. Preferably, $D_1$ and $D_1'$, or $D_2$ and $D_2'$ combine to form the following nucleus:

2-pyrazolin-5-one, pyrazolidine-3,5-dione, imidazolin-5-one, hydantoin, 2- or 4-thiohydantoin, 2-iminooxazolidin-4-one, 2-oxazolidin-5-one, 2-thixazolidine-2,4-dione, isoxazolin-5-one, 2-thiazolin-4-one, thiazolin-4-one, thiazoline-2,4-dione, rhodanine, thiazolidine-2,4-dithione, isorhodanine, indane-1,3-dione, thiophen-3-one, thiophen-3-one-1,1-dioxide, indolin-2-one, indolin-3-one, indazolin-3-one, 2-oxoindazolinium, 3-oxoindazolinium, 5,7-dioxa-6,7-dihydrothiazolo(3,2-a)pyrimidine, cyclohexane-1,3-dione, 3,4-dihydroisoquinolin-4-one, 1,3-dioxane-4,6-dione, barbituric acid, 2-thiobarbituric acid, chroman-2,4-dione, indazolin-2-one or pyrido(1,2-a)pyrimidine-1,3-dione.

More preferably, the nucleus is 1,3-dialkylbarbituric acid, 1,3-dialkyl-2-thiobarbituric acid or 3-alkylrhodanine wherein each alkyl group is preferably an unsubstituted alkyl group).

Preferred examples of a substituent linking to nitrogen atom(s) contained in the nucleus include a hydrogen atom, an alkyl group having 1 to 18, preferably 1 to 7 or particularly preferably 1 to 4 carbon atoms (for example, a methyl, ethyl, n-propyl isopropyl, n-butyl, isobutyl, hexyl, octyl, dodecyl or octadecyl group or the like), a substituted alkyl group {for example, an aralkyl group (for example, a benzyl or 2-phenylethyl group or the like), a hydroxyalkyl group (for example, a 2-hydroxyethyl or 3-hydroxypropyl group or the like), a carboxyalkyl group (for example, a 2-carboxyethyl, 3-carboxypropyl, 4-carboxybutyl or carboxymethyl group or the like), an alkoxyalkyl group (for example, a 2-methoxyethyl or 2-(2-methoxyethoxy)ethyl group or the like), a sulfoalkyl group (for example, a 2-sulfoethyl, 3-sulfopropyl, 3-sulfobutyl, 4-sulfobutyl, 2-(3-sulfopropoxy)ethyl, 2-hydroxy-3-sulfopropyl or 3-sulfopropoxyethoxyethyl group or the like), a sulfatoalkyl group (for example, a 3-sulfatopropyl or 4-sulfatobutyl group or the like), a heterocyclic ring-substituted alkyl group (for example, a 2-(pyrrolidin-2-on-1-yl)ethyl, tetrahydrofurfuryl or 2-morpholinoethyl group or the like), a 2-acetoxyethyl group, a carbomethoxymethyl group, a 2-methanesulfonylaminoethyl group or the like}, an allyl group, an aryl group (for example, a phenyl or 2-naphthyl group or the like), an unsubstituted aryl group (for example, a 4-carboxyphenyl, 4-sulfophenyl, 3-chlorophenyl or 3-methylphenyl group or the like), and a heterocyclic group (for example, a 2-pyridyl or 2-thiazolyl group or the like).

Each of $R_4$ and $R_5$ is a substituent of a tertiary amine used in synthesis, and thus includes any of substituents of general tertiary amines.

$R_4$ and $R_5$ may be the same or different, and preferably include unsubstituted alkyl groups each having 18 or less carbon atoms (for example, methyl, ethyl, propyl, butyl, pentyl, octyl, decyl, dodecyl or octadecyl groups or the like), or substituted alkyl groups {preferably, alkyl groups having 18 or less carbon atoms as substituted, for example, with a carboxyl group, a sulfo group, a cyano group, halogen atom(s) (for example, fluorine, chlorine or bromine atoms or the like), a hydroxyl group, an alkoxycarbonyl, aryloxycabonyl or aralkyloxycarbonyl group having 8 or less carbon atoms (for example, a methoxycarbonyl, ethoxycarbonyl, phenoxycarbonyl or benzyloxycarbonyl group or the like), a substituted or unsubstituted alkoxy group having 8 or less carbon atoms (for example, a methoxy, ethoxy, benzyloxy or phenethyloxy group or the like), a monocyclic aryloxy group having 10 or less carbon atoms (for example, a phenoxy or p-tolyloxy group or the like), an acyloxy group having 3 or less carbon atoms (for example, an acetyloxy or propionyloxy group or the like), an acyl group having 8 or less carbon atoms (for example, an acetyl, propionyl, benzoyl or mesyl group or the like), a substituted or unsubstituted carbamoyl group (for example, a carbamoyl, N,N-dimethylcarbamoyl, morpholinocarbonyl or piperidinocarbonyl group or the like), a substituted or unsubstituted sulfamoyl group (for example, a sulfamoyl, N,N-dimethylsulfamoyl, morpholinosulfonyl or piperidinosulfonyl group or the like), a substituted or unsubstituted aryl group having 10 or less carbon atoms (for example, a phenyl, 4-chlorophenyl, 4-methylphenyl or α-naphthyl group or the like), or the like as substituent(s)}, cyano groups, alkoxy groups (for example, methoxy or ethoxy groups or the like), aryloxy groups (for example, phenoxy groups or the like), or alkoxycarbonyl groups (for example, ethoxycarbonyl groups or the like).

Further, $R_4$ and $R_5$ may combine to form a heterocyclic ring except an aromatic heterocyclic ring. Preferred example of such a heterocyclic ring include pyrrolidine, piperidine, morpholine, piperazine, tetrahydropyridine, dihydropyridine, tetrahydroquinoline and the like.

More preferred $R_4$ and $R_5$ are ethyl groups.

Preferred examples of a heterocyclic ring formed containing $Q_2$ include a pyrrole nucleus, a carbazole nucleus, an indole nucleus, a pyrazole nucleus, a pyrazolo(1,5-a)benzimidazole nucleus, a pyrazole(1,5-b)quinazolone nucleus, an indazole nucleus and the like.

A 5- or 6-membered heterocyclic ring formed containing $W_1$ or $W_2$ is one represented by removing an oxo group or a thioxo group at an appropriate position of a heterocyclic ring formed containing $D_1$ and $D_1'$, or $D_2$ and $D_2'$.

Preferred $R_6$ and $R_8$ are identical to examples of the substituent(s) previously stated as those linking to nitrogen atom(s) contained in the nucleus of a heterocyclic ring formed containing $D_1$ and $D_1'$, or $D_2$ or $D_2'$.

Ar represents an aromatic group, and is preferably a substituted or unsubstituted aryl group (for example, a phenyl, 3-chlorophenyl or naphthyl group or the like).

Each of $L_1, L_2, L_3, L_4, L_5, L_6, L_7, L_8, L_9, L_{10}, L_{11}, L_{12}, L_{13}, L_{14}, L_{15}, L_{16}, L_{17}, L_{18}, L_{19}, L_{20}, L_{21}, L_{22}, L_{23}, L_{24}, L_{25}, L_{26}, L_{27}, L_{28}, L_{29}, L_{30}, L_{31}, L_{32}, L_{33}$ and $L_{34}$ represents a methine group {which may optionally be substituted with a substituted or unsubstituted alkyl group (for example, a methyl or ethyl group or the like), a substituted or unsubstituted aryl group (for example, a phenyl group or the like) or a halogen atom (for example, a chlorine or bromine atom or the like)}, or alternatively may form a ring together with another methine group or an auxochrome.

Specific examples of methine dyes used in the present invention are illustrated below, but the cope of the present invention should not be interpreted to be limited thereto.

Examples of compounds represented by the general formula (II):

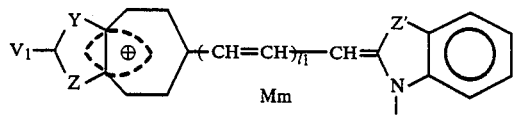

| Compound | Y | Z | $V_1$ | Z' | $R_2$ | $l_1$ | M | m |
|---|---|---|---|---|---|---|---|---|
| (1) | N | N—CH$_3$ | H | S | C$_2$H$_5$ | 0 | I$^-$ | 1 |
| (2) | N | N—CH$_3$ | SCH$_3$ | S | C$_2$H$_5$ | 0 | I$^-$ | 1 |
| (3) | N | N—CH$_3$ | Cl | S | C$_2$H$_5$ | 0 | I$^-$ | 1 |
| (4) | N | N—CH$_3$ | OCH$_3$ | S | C$_2$H$_5$ | 0 | I$^-$ | 1 |
| (5) | N | N—CH$_3$ | -C$_6$H$_5$ | S | C$_2$H$_5$ | 0 | I$^-$ | 1 |
| (6) | N | N—C$_2$H$_5$ | SCH$_3$ | N—C$_2$H$_5$ | C$_2$H$_5$ | 0 | I$^-$ | 1 |
| (7) | N | N—CH$_3$ | SCH$_3$ | O | C$_2$H$_5$ | 0 | I$^-$ | 1 |
| (8) | N | N—(CH$_2$)$_4$SO$_3^-$ | -C$_6$H$_5$ | O | CH$_2$CO$_2$H | 0 | — | — |
| (9) | N | N—CH$_3$ | -C$_6$H$_5$ | Se | C$_2$H$_5$ | 1 | CH$_3$-C$_6$H$_4$-SO$_3^-$ | 1 |
| (10) | N | N—CH$_3$ | SCH$_3$ | S | C$_2$H$_5$ | 1 | I$^-$ | 1 |
| (11) | N | N—CH$_3$ | —H | N—CH$_3$ | CH$_3$ | 2 | I$^-$ | 1 |
| (12) | N | N—CH$_3$ | OCH$_3$ | S | CH$_3$ | 3 | I$^-$ | 1 |
| (13) | N | S | SCH$_3$ | O | C$_2$H$_5$ | 0 | I$^-$ | 1 |
| (14) | N | O | H | S | CH$_3$ | 1 | I$^-$ | 1 |
| (15) | N | Se | H | Se | CH$_3$ | 1 | I$^-$ | 1 |
| (16) | N | N—CH$_3$ | —Cl | CH$_3$\C/CH$_3$ | CH$_3$ | 2 | ClO$_4^-$ | 1 |
| (17) | CH | N—CH$_3$ | —Cl | S | C$_2$H$_5$ | 3 | I$^-$ | 1 |
| (18) | CH | O | —Cl | S | C$_2$H$_5$ | 0 | I$^-$ | 1 |
| (19) | CH | S | —Cl | O | C$_2$H$_5$ | 0 | Br$^-$ | 1 |

(20)

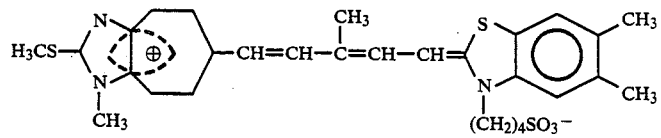

(21)

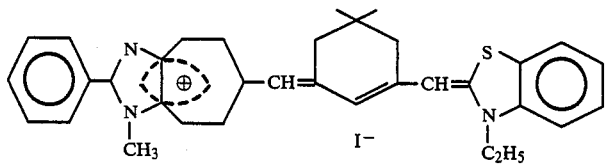

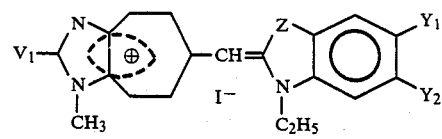

| Compound | V₁ | Z | Y₁ | Y₂ |
|---|---|---|---|---|
| (22) | 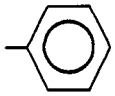 | O | OCH₃ | OCH₃ |
| (23) | SCH₃ | S | CH₃ | CH₃ |
| (24) | H | N—C₂H₅ | CH₃ | H |
| (25) | 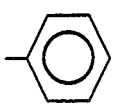 | S | NO₂ | H |
| (26) | H | S | Cl | Cl |
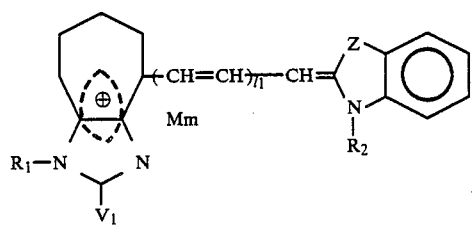
| Compound | V₁ | R₁ | Z | R₂ | l₁ | M | m |
|---|---|---|---|---|---|---|---|
| (27) | SCH₃ | CH₃ | S | C₂H₅ | 0 | I⁻ | 1 |
| (28) | SCH₃ | (CH₂)₃SO₃⁻ | S | (CH₂)₃SO₃H.N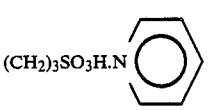 | 0 | — | — |
| (29) |  | CH₂CO₂H | O | C₂H₄OCH₃ | 1 | Cl⁻ | 1 |
| (30) | 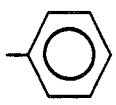 | CH₃ | Se | C₂H₅ | 2 | I⁻ | 1 |
(31)
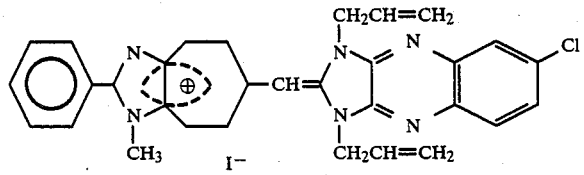
(32)
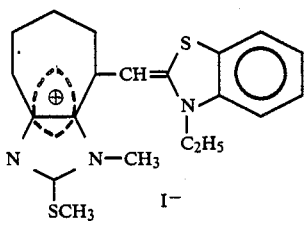

(33) 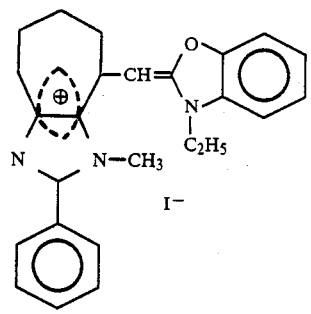
Examples of compounds represented by the general formula (III):
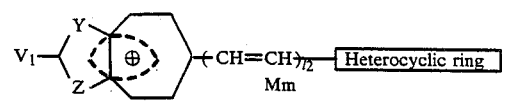
| Compound | Y | Z | V₁ | $l_2$ | M | m | Heterocyclic ring |
|---|---|---|---|---|---|---|---|
| (34) | N | N—CH₃ | phenyl | 1 | I⁻ | 1 | N-ethyl indole |
| (35) | N | N—C₂H₅ | SCH₃ | 1 | Br⁻ | 1 | 2-phenyl-1-phenyl indole |
| (36) | N | N—CH₃ | Cl | 1 | H₃C—C₆H₄—SO₃⁻ | 1 | 1,5-diphenyl pyrazole |
| (37) | N | N—(CH₂)₄SO₃⁻ | OCH₃ | 1 | — | — | N-ethyl pyrrole |
| (38) | N | N—CH₃ | phenyl | 1 | I⁻ | 1 | pyrazole-methyl derivative |

-continued
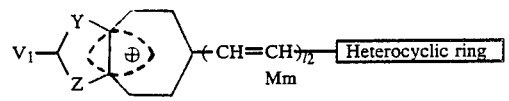
| Compound | Y | Z | $V_1$ | $l_2$ | M | m | Heterocyclic ring |
|---|---|---|---|---|---|---|---|
| (39) | N | O | SCH$_3$ | 1 | I$^-$ | 1 | |
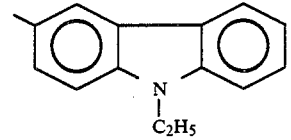
| (40) | N | N—CH$_3$ |  | 1 | Br$^-$ | 1 |  |
(41)
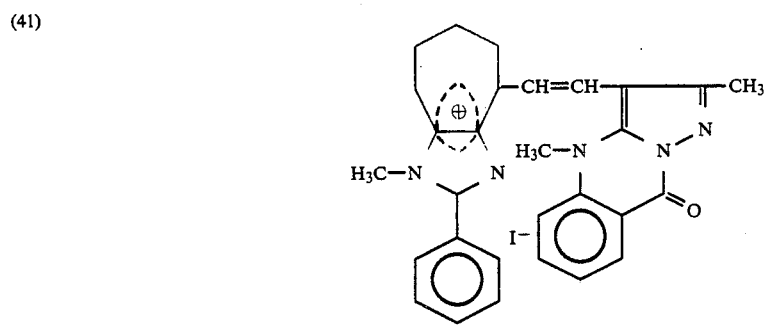
(42)
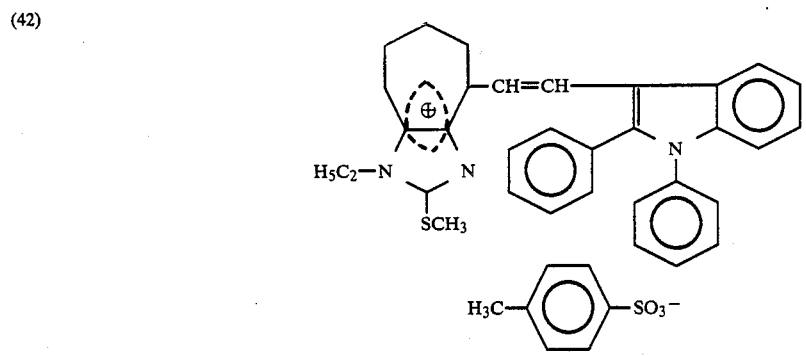
Examples of compounds represented by the general formula (IV):
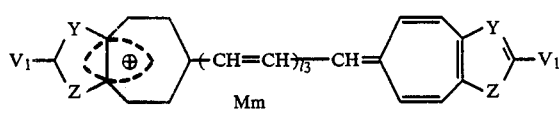
| Compound | Y | Z | $V_1$ | $l_3$ | M | m |
|---|---|---|---|---|---|---|
| (43) | N | N—CH$_3$ | H | 0 | I$^-$ | 1 |
| (44) | N | N—CH$_3$ | SCH$_3$ | 0 | I$^-$ | 1 |
| (45) | N | N—CH$_3$ | SCH$_3$ | 1 | I$^-$ | 1 |
| (46) | N | N—(CH$_2$)$_3$SO$_3^-$ | 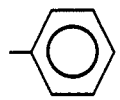 | 0 | Na$^+$ | 1 |

-continued
| | | | | | | |
|---|---|---|---|---|---|---|
| (47) | N | S | 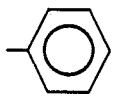 | 1 | Br⁻ | 1 |
| (48) | N | O | SCH₃ | 1 | Br⁻ | 1 |
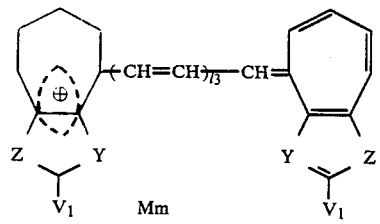
| Compound | Y | Z | $V_1$ | $l_3$ | M | m |
|---|---|---|---|---|---|---|
| (49) | N | N—CH₃ | SCH₃ | 0 | I⁻ | 1 |
| (50) | N | N—CH₃ | SCH₃ | 1 | I⁻ | 1 |
| (51) | N | N—(CH₂)₄SO₃⁻ | 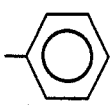 | 0 | $HN(C_2H_5)_3^+$ | 1 |
| (52) | N | N—CH₃ |  | 1 | CF₃SO₃⁻ | 1 |
| (53) | N | N—CH₂CO₂H | H | 1 | Cl⁻ | 1 |
(54)
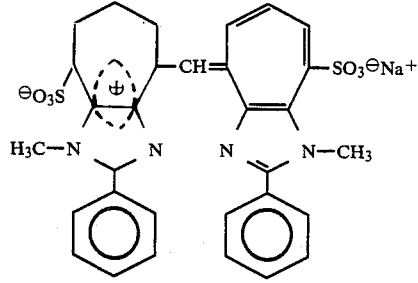
(55)
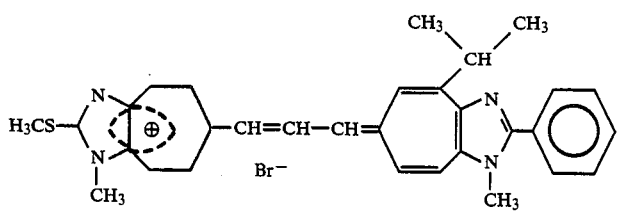
(56)
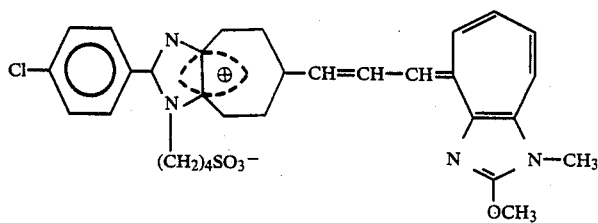
Examples of compounds represented by the general formula (V):

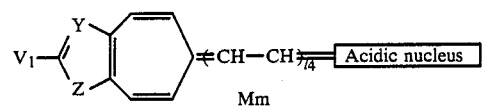

| Compound | Y | Z | $V_1$ | $l_4$ | M | m | Acidic nucleus |
|---|---|---|---|---|---|---|---|
| (57) | N | N—$CH_3$ | H | 0 | — | — | (3-ethyl-rhodanine) |
| (58) | N | N—$CH_3$ | $SCH_3$ | 0 | — | — | (1,3-diethyl-2-thiobarbituric acid) |
| (59) | N | N—$CH_3$ | $SCH_3$ | 0 | — | — | (1,3-di-n-butyl barbituric acid) |
| (60) | N | N—$CH_3$ | $SCH_3$ | 1 | — | — | (3-ethyl-rhodanine) |
| (61) | N | N—$C_2H_5$ | phenyl | 2 | — | — | (3-ethyl-2-thio-2,4-oxazolidinedione) |
| (62) | N | N—$(CH_2)_3SO_3^-$ | H | 1 | $Na^+$ | 1 | (1,3-diethyl-2-thiobarbituric acid) |
| (63) | N | S | $SCH_3$ | 2 | $K^+$ | 1 | (1-ethyl-3-(3-sulfopropyl)-2-thiobarbituric acid) |
| (64) | N | N—$CH_3$ | $SCH_3$ | 0 | — | — | =C(CN)$_2$ |
| (65) | N | N—$CH_3$ | phenyl | 0 | — | — | =C(SO$_2$CH$_3$)(CN) |

-continued
| | | | | | | | |
|---|---|---|---|---|---|---|---|
| (66) | N | N—C$_2$H$_5$ | H | 0 | — | — | 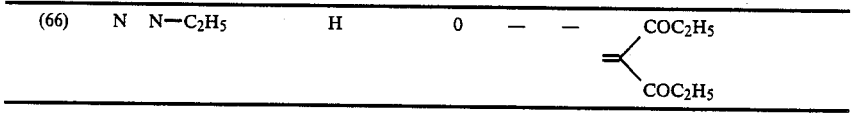 |
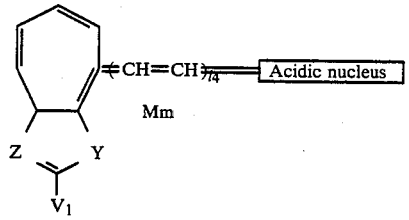
| Compound | Y | Z | V$_1$ | l$_4$ | M | m | Acidic nucleus |
|---|---|---|---|---|---|---|---|
| (67) | N | N—CH$_3$ | H | 0 | — | — | 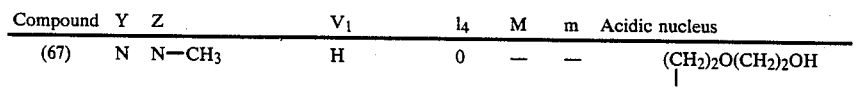 |
| (68) | N | N—CH$_3$ | 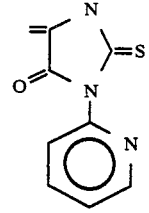 | 1 | — | — | 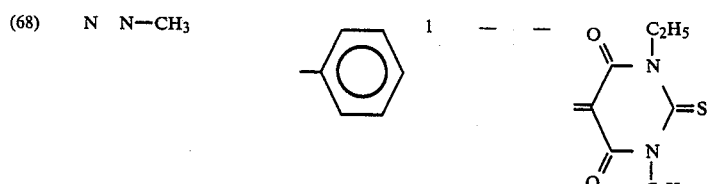 |
| (69) | N | N—C$_2$H$_5$ | SCH$_3$ | 1 | — | — | 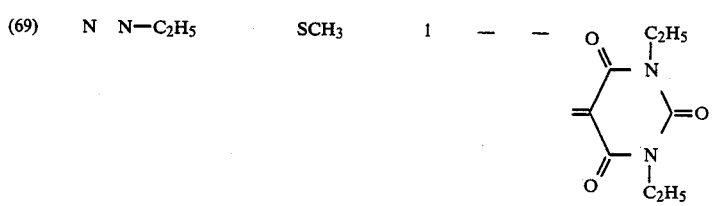 |
| (70) | N | N—C$_2$H$_5$ | H | 1 | — | — | 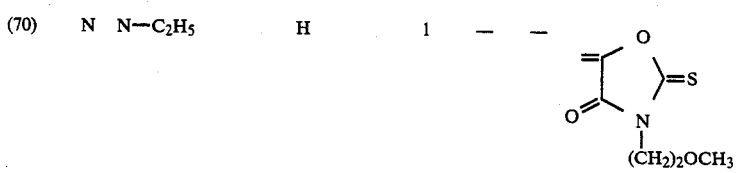 |
| (71) | N | S | H | 2 | — | — | 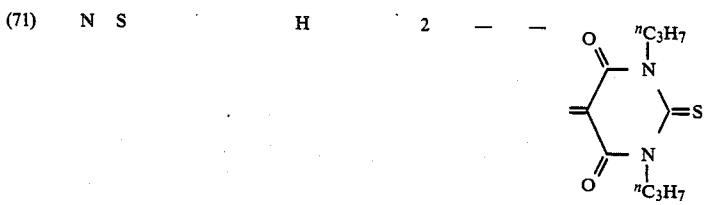 |
| (72) | N | N—CH$_3$ | | 0 | — | — | 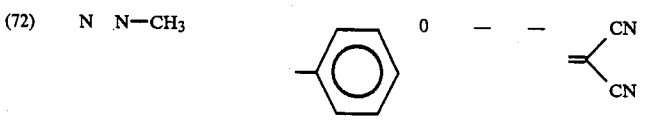 |
| (73) | N | N—C$_2$H$_5$ | H | 1 | — | — | 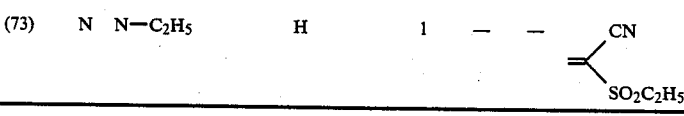 |

Examples of compounds represented by the general formula (VI):
| Compound | Y | Z | V₁ | R₄ | R₅ | M | m |
|---|---|---|---|---|---|---|---|
| | | | 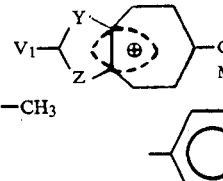 | | | | |
| (74) | N | N—CH₃ | (4-methylphenyl) | C₂H₅ | C₂H₅ | I⁻ | 1 |
| (75) | N | N—CH₃ | —SCH₃ | C₂H₅ | C₂H₅ | I⁻ | 1 |
| (76) | N | N—C₂H₅ | H | —(CH₂)₂O(CH₂)₂— | | Br⁻ | 1 |
| | | | 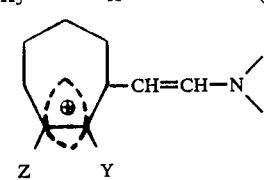 | | | | |
| (77) | N | N—CH₃ | SCH₃ | C₂H₅ | C₂H₅ | I⁻ | 1 |
| (78) | N | N—(CH₂)₄SO₃⁻ | (4-methylphenyl) | —(CH₂)₄— | | — | — |
| (79) | N | S | SCH₃ | —(CH₂)₅— | | I⁻ | 1 |
Examples of compounds represented by the general formula (VII):
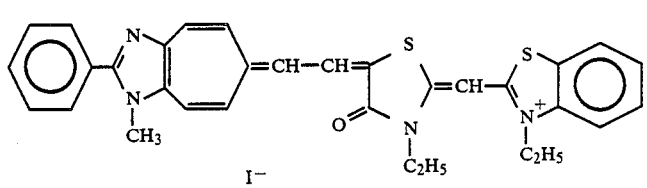
(80)
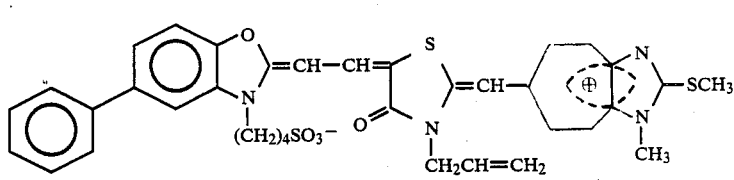
(81)
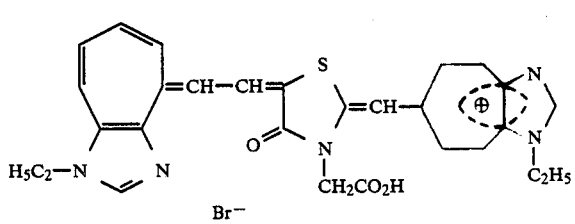
(82)
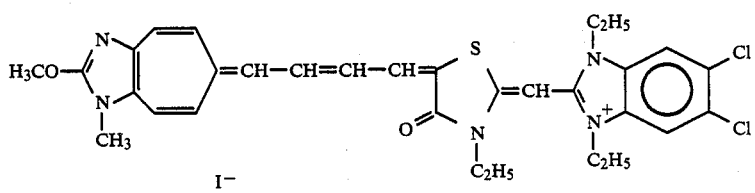
(83)
Examples of compounds represented by the general formula (VIII):

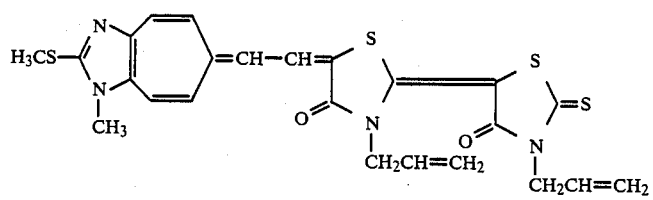
(84)

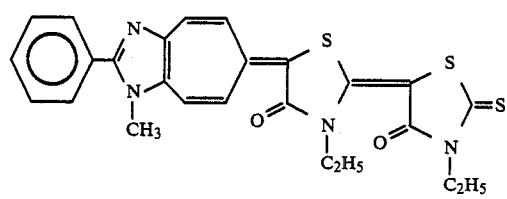
(85)

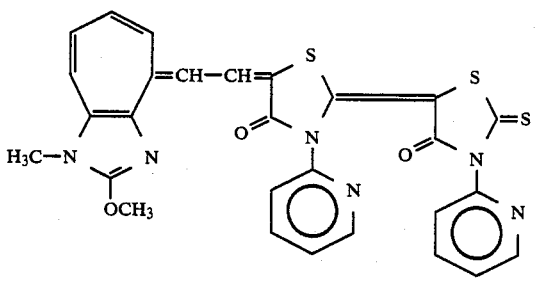
(86)

Examples of compounds represented by the general formula (IX):

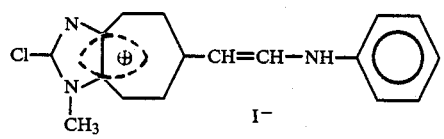
(87)

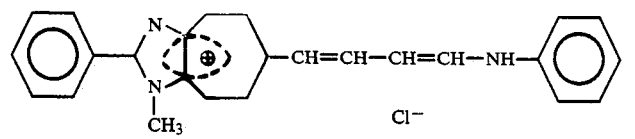
(88)

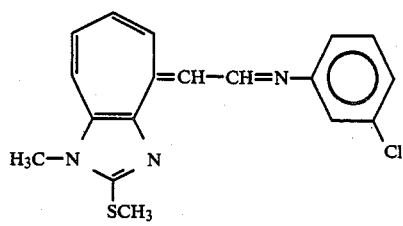
(89)

Methine dyes of the present invention are usable as photographic sensitizing dyes, desensitizing dyes or dyes (dyestuffs).

It greatly depends on energy level of a dye (which can be evaluated by oxidation potential or reduction potential) which performance of that as a sensitizing dye and that as a desensitizing dye the dye has or how much sensitivity the dye has, as is well known, for example in T. H. James, The Theory of the Photographic Process, the 4th eddition, Macmillan, Chapter 10, pages 251 to 290.

Dyes of the present invention may become either of sensitizing dyes and desensitizing dyes by varying energy level of them, for example through changing kind of the basic nucleus in case of dyes represented by the general formula (II).

Examples are shown below.
(a) Examples of basic nucleus when a dye exhibits a sensitizing performance:
1-alkylbenzimidazole nucleus, 5,6-dimethoxybenzoxazole nucleus, 5,6-dimethylbenzothiazole nucleus and the like
(b) Examples of basic nucleus when a dye exhibits a desensitizing performance:
5-chloro-1-alkylimidazo(4,5-b)quinoxaline nucleus, 6-nitrobenzothiazole nucleus, 5,6-dichlorobenzothiazole nucleus and the like (c) Examples of basic nucleus when a dye exhibits both a low sensitizing performance and a low desensitizing performance:

benzothiazole nucleus, benzoxazole nucleus and the like

N-substituents of the above (a), (b) and (c) basic nuclei are substituted or unsubstituted alkyl groups.

Each of the compounds of the general formulae (III) to (IX) may become either of a sensitizing dye and a desensitizing dye, since energy level of the dye can be varied by changing a combination of substituent(s) and/or heterocyclic ring(s).

Synthetic processes of dyes used in the present invention are basically classified into the following two categories.

In the first synthetic process, a heteroazulene nucleus having a positive charge is used as a starting substance. A carbon atom in the heteroazulene nucleus having a positive charge (carbocation) is attacked by a nucleophilic agent. By selecting a suitable nucleophilic agent, a methine dye having a methine bond at the carbon atom which was nucleophilically attacked may be obtained.

In the second synthetic process, a heteroazulene nucleus having a positive charge, at least one carbon atom of which has a methyl substituent is used as a starting substance. This methyl-substituted part is deprotonized with a base to form a carbon atom having a negative charge (carbanion), which is then attacked by an electrophilic agent. A methine dye having a methine bond at the methyl-substituted part is obtained by selecting a proper electrophilic agent.

Though many heteroazulene nuclei are usable for the present invention, those which can readily be synthesized and are particularly useful include a cycloheptofuran nucleus, a cycloheptothiophene, a cycloheptopyrrole nucleus, a cycloheptoxazole nucleus, a cycloheptothiazole nucleus, a cycloheptimidazole nucleus, a cycloheptopyrazole nucleus, a cycloheptotriazole nucleus and the like, as disclosed in D. Ginsburg, Non-Benzenoid Aromatic Compounds, Chapter VII, pages 434 to 446, Interscience Publishers (1959).

As methods for giving each nucleus a positive charge, there are a method where a nitrogen atom is quaternarized when the nucleus has nitrogen atom(s), a method by an oxidation reaction when the nucleus does not have any nitrogen atom, and the like.

Explanation is made below on a cycloheptimidazole nucleus as a particularly preferred example.

(Synthetic method 1)

A methine dye of the present invention represented by the general formula (XII) may be prepared by condensing a cycloheptimidazolium ion represented by the general formula (X) with a precursor of auxochrome and methine bond as represented by the general formula (XI):

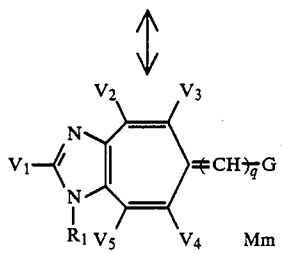

(X)

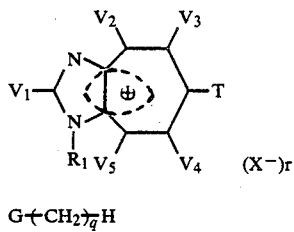

(XI)

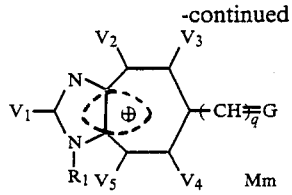

(XII)

wherein G represents one of the formulae (XII) and (XIV):

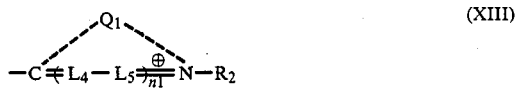

(XIII)

(XIV)

In the formulae (XIII) and (XIV), $R_2$, $Q_1$, $L_4$ and $L_5$ have the same meanings as those in the general formula (II), respectively, and $D_1$, $D_1'$, $L_{16}$ and $L_{17}$ have the same meanings as those in the general formula (V), respectively.

In the formulae (X) and (XII), $R_1$, $V_1$ to $V_5$, M and m have the same meanings as those in the general formula (I), respectively.

$X^-$ in the formula (X) represents an anion, and r represents a number necessary for neutralizing charge of a compound represented by the formula (X).

Examples of an anion represented by $X^-$ are preferably those previously mentioned as examples of an anion of a charge balance counter ion M, particularly preferably a trifluoromethanesulfonate ion.

In the formula (X), T represents a hydrogen atom or an eliminable group generally used in organic synthetic chemistry, for example an eliminable group disclosed in Jerry March, "Advanced Organic Chemistry: Reactions, Mechanism and Structure", published by Mcgraw-hill Kogakusha (1977), pages 265 to 452. Preferred examples of such as eliminable group are halogen atoms (for example, chlorine, bromine or iodine atoms or the like), alkylthio groups (for example, ethylthio groups or the like), alkoxy groups (for example, methoxy groups or like) and alkylsulfonyl groups (for example, methylsulfonyl groups or the like). Particularly preferred T group is a hydrogen atom.

q in the formulae (XI) and (XII) is 0 or 1.

Bonding position of T and the methine group in the formulae (X) and (XII) may be any of the 4-, 5-, 6-, 7- and 8-positions, as is in the general formula (I).

A compound of the formula (XI) wherein G represents a formula (XIII) and q is 1 is a methyl quaternary compound, and is used as a starting substance for the corresponding methylene base.

Reactions for condensing bases are well known techniques for preparation of monomethinecyanine dyes. Such reactions are disclosed in T. H. James, The Theory of The Photographic Process, 4th eddition, Macmillan, 1977, Chapter 8, page 206.

For condensation of a methylene base for preparing a cyanine dye, it is necessary for each of the two basic nuclei being to be reacted to contain a reactive substance, and it has been found that a cycloheptimidazolium ion of the formula (X) comes under nucleophilic attack at a 7-membered carbon atom. The reaction is liable to occur at the 4-, 6- or 8-position, particularly at the 4- or 6-position depending or the electronic state. Thus, a condensation reaction of a methylene base and an activated cycloheptimidazolium ion can be carried out through a methylene base condensation reaction according to general methods used for preparation of cyanine dyes.

Similarly, a compound of the formula (XI) wherein q is 0 and G is a group represented by the formula (XIV), which is a ketomethylene or cyanomethylene, is condensed with an activated cycloheptimidazolium ion to form a merocyanine-like dye. As for the reaction position, there is the same tendency as in the above cyanine-like dye synthesis. That is, the reaction is liable to occur at the 4-, 6- or 8-position, particularly at the 4- or 6-position. Condensation reaction of a ketomethylene or a cyanomethylene with an activated cycloheptimidazolium ion may be carried out according to general methods used in preparation of merocyanine dyes.

Methods used for preparation of cyanine dyes or merocyanine dyes may also be used for condensation reaction of a compound of the formula (X) with a compound of the formula (XI). The condensation reaction may be carried out at room temperature or may be accelerated with heating.

Examples of usable reaction solvent(s) include acetonitrile, aliphatic or aromatic hydrocarbons or halogenated derivatives thereof such as benzene, toluene, xylene or decane; ether; pyridine; dimethylsulfoxide; dimethylformamide; and alcohols such as methanol and ethanol. Acetonitrile, pyridine, dimethylformamide, methanol and ethanol are particularly preferable.

For condensation using a methylene base, an organic base, for example a tertiary amine (for example, triethylamine, 1,8-diazabicylo(5,4,0)-7-undecene (DBU) or the like), tetramethylguanidine or piperidine is used.

The first synthetic method for dyes used in the invention is useful for preparation of a methine dye wherein a cycloheptimidazole nucleus is connected with a basic nucleus of a type found in cyanine dyes through one methine group, or a methine dye wherein a cycloheptimidazole nucleus is directly connected with an acidic nucleus of a type found in merocyanine dyes. Thus, methine dyes prepared by the first synthetic method are monomethine dyes of the general formula (II) and zeromethine dyes of the general formula (V).

A cycloheptimidazole nucleus symmetry monomethine or trimethyne dye may be synthesized by reaction of a compound of the formula (X) with a malonic acid or a glutaconic acid (this method is similar to the first synthetic method) by applying a synthetic method disclosed in F. M. Hamer, Heterocyclic Compounds-Cyanine Dyes and Related Compounds, Chapter 2, pages 72 and 73, Chapter 4, page 111, John Wily and Sons Company (1964). According to the synthetic method, monomethine and trimethine dyes of the general formula (IV) may be synthesized. The reaction is liable to occur at the 4- or 6-position, particularly at the 4-position of the cycloheptimidazolium ion.

A method for synthesizing hemicyanine type dyes of the general formula (VI) as a special synthetic method similar to the first synthetic method is described below.

A dimethinehemicyanine type dye represented by the general formula (VI) may be synthesized by condensing a compound of the formula (X) with a tertiary amine having at least one ethyl group.

The reaction is liably to occur at the 4-, 6- or 8-position, particularly at the 4-position.

(Synthetic method 2)

The second synthetic method make possible synthesis of methine dyes each containing 2 or more methine groups which connect a cycloheptimidazole nucleus with the remaining basic or acidic nucleus.

Methine dyes which can be synthesized according to the second method are represented by the following formula (XV):

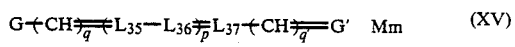

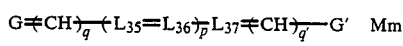

Such a dye may be prepared by condensing a compound represented by the formula (XVI).

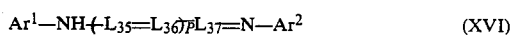

with a compound represented by the formula (XVII)

and then condensing the condensation product with a compound represented by the formula (XVIII)

In the formulae, $Ar^1$ and $Ar^2$ are carbon ring aromatic groups, and G and G' each represent groups represented by the formula (XIX), (XIII) or (XIV):

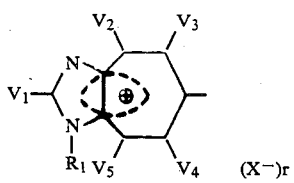

wherein $R_1$ and $V_1$ to $V_5$ have the same meanings as those in the general formula (I), respectively, and $X^-$ and r have the same meanings as those in the formula (X), respectively.

When G and G' in the formulae (XVII) and (XVIII) satisfy the formula (XIX), q and q' are 1, and at that time bonding position of the methyl group may be any of the 4-, 5-, 6-, 7- and 8-positions, but preferably be the 4-, 6- or 8-position, more preferably the 4- or 6-position.

Further, $L_{35}$, $L_{36}$ and $L_{37}$ in the formulae (XV), (XVI), (XVII) and (XVIII) represent optionally substituted methine groups, and each have the same meansings with $L_1$, $L_2$, $L_3$, $L_4$ and $L_5$ in the general formula (II).

q and q' are 0 or 1, and p is 0 or a positive integer and typically 0, 1, 2 or 3. At least one of G and G' represents the formula (XIX).

As apparent from the foregoing, a starting substance necessary for the second synthetic method of dyes used in the invention is a cycloheptimidazolium ion having a methyl substituent.

When a methine dye having only one cycloheptimidazole nucleus is synthesized, a compound of the formula (XVII) or (XVIII) wherein one of G and G' is represented by the formula (XVIII) or (XIV) is used.

A comound necessary as the remaining starting substance is that of the formula (XVI). When p is 0 and $L_{15}$ is —CH—, a compound of the formula (XVI) is apparently a diarylformamidine, typically diphenylformamidine. When p is a positive integer, a compound of the formula (XVI) obtained is an analog of a diarylformamidine or a vinylog.

A compound obtained by reaction of an analog of a diarylformamidine or vinylog represented by the formula (XVI) with a compound of the formula (XVII) wherein G satisfies one of the formula (XIII) or (XIV) is an intermediate generally used for preparation of a cyanine dye or a merocyanine dye.

Though these intermediates are often used as such, their reactivities can be increased by acyl substitution of the N-hydrogen, for example by reaction with a carboxylic acid or an arhydride thereof. Acetyl-substituted intermediates are most generally used. When these intermediates each contain a quaternary ammonium nucleus as represented by the formula (XIII), they are often called I.C.I. intermediates. On the other hand, when these intermediates each contain a ketomethylene or cyanomethylene as represented by the formula (XIV), they are often called Dains intermediates. Use methods of I.C.I. intermediates and Dains intermediates in synthesis of cyanine dyes and merocyanine dyes are disclosed in T. H. James, The Theory of the Photographic Process pages 195 to 212 which is previously cited.

A new intermediate for preparation of dyes is obtained by reacting an analog of a diarylformamidine or vinylog represented by the formula (XVI) with a compound of the formula (XVII) wherein G satisfies the formula (XIX). The obtained dye intermediate containing a cycloheptimidazole nucleus can be used similarly to an I.C.I. intermediate and a Dains intermediate known in preparation of a methine dye.

A dye intermediate obtained by reacting a compound of the formula (XVI) with a compound of the formula (XVII), and if necessary acylacting the product can be represented by the formula (XX):

$$Ar^1\text{—}NR_9\text{(}L_{35}\text{=}L_{36}\text{)}_p L_{37}\text{(=CH)}_q G \qquad (XX)$$

wherein $R_9$ represents hydrogen or acyl, and the remaining symbols are as previously defined.

A dye of the formula (XV) can be synthesized by condensing a compound of the formula (XVIII) with a dye intermediate of the formula (XX). The order of whole reactions from a starting substance to a final dye is similar to that in synthesis known in preparation of a cyanine dye and a merocyanine dye, except for a methyl-substituted cycloheptimidazolium ion. Though the reaction generally progresses at room temperature, the reaction may be promoted according to necessity with heating. The reaction may also be carried out in the same solvent as that used in the aforementioned first synthetic method of a dye of the invention.

The second synthetic method is more useful than the first synthetic method in that larger number of methine groups can be introduced in the dye and in that the substitution position of methine bond in the cycloheptimidazole nucleus is not aubitrary and amount of by-products is small. Substituted or unsubstitited methine group(s) of a necessary number may be introduced according to the second synthetic method.

Since absorption of a dye having 1 or 2 or more cycloheptimidazole nuclei shifts to deep color, it is in fact seldom necessary for obtaining absorption of a dye of long wavelength that p in the formula (XV) exceeds 3.

Though the above explanation was made citing as methine sources analogs of diarylformamidines or vinylogs represented by the formula (XVI), other methine sources, for example analogs of orthoesters or vinylogs may of cource be used.

Methine dyes of the general formulae (II), (III), (IV), (V), (VI) and (IX) may be synthesized using the second synthetic method.

Further, methine dyes of the general formulae (VII) and (VIII) may be synthesized referring to the first and second synthetic methods and F. M. Hamer, Heterocyclic Compounds-Cyanine Dyes and Related Compounds, John Wily and Sons Company (1964).

Compounds which satisfy the formula (X) and (XIX) are cycloheptimidazolium ions as starting substances in the first and second synthetic methods, and synthesis of (X): $R_1=CH_3$, $V_1=SCH_3$, $V_2$ to $V_5=H$, $T=H$
(XIX): $R_1=CH_3$, $V_1=SCH_3$, $V_2$ to $V_5=H$
as representative examples thereof is explained below.

2-Hydroxy-2,4,6-cycloheptatrien-1-one readily obtained according to a method disclosed in Journal of the American Chemical Society, vol. 37, No. 22, pages 5257 to 5259 (1965), or 2-hydroxy-5-methyl-2,4,6-cycloheptatrien-1-one readily obained according to the method disclosed in Bulletin of the Chemical Society of Japan, vol. 32, pages 493 to 496 (1959) is O-methylated with a methylating agent (for example, dimethyl sulfate) to obtain 2-methoxy-2,4,6-cycloheptatrien-1-one or 2-methoxy-5-methyl-2,4,6-cycloheptatrien-1-one, respectively, which is then condensed with thiourea to obtain 2-mercaptocycloheptimidazole or 2-mercapto-6-methylcycloheptimidazole, respectively. They are then each S-methylated with a methylating agent (for example, methyl iodide) to obtain 2-methylthiocycloheptimidazole or 6-methyl-2-methylthiocycloheptimidazole, respectively.

They are furhter each N-methylated with a methylating agent (for example, methyl trifluoromethanesulfonate) to obtain 3-methyl-2-methylthiocycloheptimidazolium ion or 3,6-dimethyl-2-methylthiocycloheptimidazolium ion.

The above overall scheme is as follows:

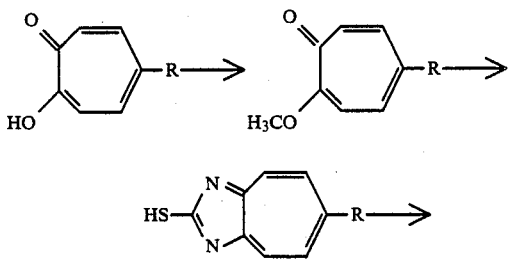

-continued

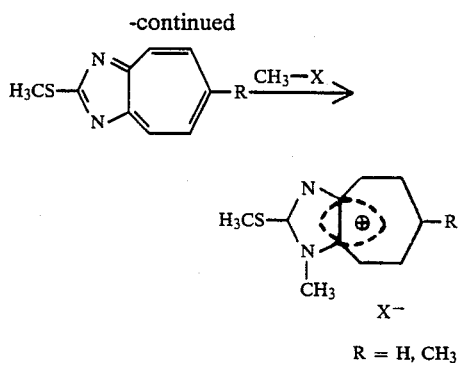

R = H, CH₃

(Synthetic example)

Synthetic examples of the above dyes are exhibited below.

Synthetic example 1

Synthesis of (2)

Synthesis of (2) is stated successively starting from synthesis of a raw material of the dye.

(a) Synthesis of 2-methoxy-2,4,6-cycloheptatrien-1-one

First, 200 g of 2-hydroxy-2,4,6-cycloheptatrien-1-one which is readily obtained according to the method disclosed in Journal of the American Chemical Society, vol. 87, No. 22, pages 5257 to 5259 (1965) and 340 g of potassium carbonate were added to 1.3 l of acetone containing 10% water, 310 g of dimethyl sulfate was added thereto and the mixture was refluxed with heating for 8 hours. After the mixture was allowed to stand overnight, deposited inorganic matters were filtered out and acetone was distilled away from the filtrate under reduced pressre. Then, 1 l of water was added to the concentrate, followed by extraction with chloroform (0.3 l×3). The chloroform layer was dried over anhydrous sodium sulfate, concentrated to evaporate the solvent and then distilled under reduced pressure (120° C./0.5 mmHg).

Colorless liquid 205.7 g (Yield 92.3%).

(b) Synthesis of 2-mercaptocycloheptimidazole

According to the method disclosed in Journal of the American Chemical Society, vol. 76, pages 3352 and 3353 (1954), 150 g of 2-methoxytropone and 84 g of thiourea were added to 255 g of a solution of 28% sodium methoxide in methanol, and stirred at room temperature for 30 minutes. Further, 600 ml of methanol was added thereto and acetic acid was added until pH of the solution becomes around 5. Deposited crystals were filtered and washed with methanol. The obtained crystals were added to 1 l of methanol, and refluexed with heating for 30 minutes. After being allowed to cool to room temperature, the crystals were filtered and dried.

Yellow crystals 125 g (Yield 70.0%), Melting point 300° C. or more.

(c) Synthesis of 2-methylthiocycloheptimidazole

First, 38 g of potassium hydroxide was dissolved in 800 ml of methanol, 100 g of 2-mercaptocycloheptimidazole was added thereto, and the mixture was stirred with heating to the inner temperature of about 45° C. Then, 131.2 g of dimethyl sulfate was added dropwise thereto and stirred with heating to the inner temperature of about 45° C. for one hour. After the solvent was distilled away to some extent under reduced pressure, 1 l of water was added and extracted with chloroform (0.5 l×2). After being dried over anhydrous sodium sulfate, the chloroform layer was evaporated under reduced pressure to 200 ml, and 1 l of hexane was added thereto to deposite crystals, which were the filtered and dried.

Colorless crystals 89 g (Yield 82.0%), Melting point 101° to 102° C.

(d) Synthesis of 3-methyl-2-methylthiocycloheptimidazolium trifluoromethanesulfonate First, 25 g of 2-methylthiocycloheptimidazole was added to 100 ml of anisole, and stirred under ice cooling. Then, 28 g of methyl trifluoromethanesulfonate was added dropwise and stirred under ice cooling. The mixture was further stirred at room temperature for 2 hours and 30 minutes, 200 ml of ethyl acetate was added thereto, and deposited crystals were filtered and dried.

Colorless crystals 39.7 g (Yield 82.0%), Melting point 163° to 164° C.

(e) Synthesis of (2)

First, 2.8 g of 3-methyl-2-methylthiocycloheptimidazolium trifluoromethanesulfonate and 2.3 g of 3-methyl-2-methylbenzothiazolium p-toluenesulfonate were added to 50 ml of acetonitrile, 2.3 g of triethylamine was further added, and the mixture was refluxed with heating for one hour. After the solvent was distilled away under reduced pressure, the mixture was subjected to purification by silica gel column chromatography using a mixed solvent of methanol/chloroform=¼ as a developing solvent. The obtained crystals were added to 50 ml of methanol and heated to dissolve it. The insoluble matters were filtered out during hot state, a solution of 1.2 g sodium iodide in 5 ml of methanol was added to the filtrate, and the mixture was allowed to cool. Deposited crystals were filtered, washed with methanol and water, and dried.

Purple crystals 0.75 g (Yield 24%), Melting point 260° to 264° C., λmax=574 nm ($\epsilon=9.95\times10^4$) (solvent methanol).

As by-product dyes in the synthesis of (2), slight amounts of dyes having a methine bond at the 4-position and the 8-position of the cycloheptimidazole nucleus, respectively are obtained. 4-position: Compound (27), 8-position: Compound (32).

Slight amounts of similar by-products dyes are also obtained in the following synthetic examples 2, 3, 4, 5, 6, 7, 8, 9 and 10 according to the first synthetic method.

Synthetic example 2

Synthesis of (7)

First, 4 g of 3-methyl-2-methylthiocycloheptimidazolium trifluoromethanesulfonate as synthesized in Synthetic example 1 (d) and 3.53 g of 3-ethyl-2-methylbenzoxazolium p-toluenesulfonate were added to 50 ml of acetonitrile, 3 ml of triethylamine was further added, and the mixture was refluxed with heating for one hour. Then, 200 ml of ethyl acetate was added to the reaction solution and the deposited crystals were collected by filtration. The crystals were added to 100 ml of methanol and dissolved therein with heating. The insoluble matters were filtered out in hot state, and a solution of 1.5 g of sodium iodide in 5 ml of methanol was added to the filtrate and allowed to cool. Deposited crystals were collected by filtration, washed with methanol and water, and dried.

Purple crystals 1.8 g (Yield 36%), Melting point 300° C. or more, λmax=547 nm ($\epsilon=1.05\times10^5$) (methanol).

Synthetic example 3

Synthesis of (58)

First, 3 g of 3-methyl-2-methylthiocycloheptimidazolium trifluoromethanesulfonate as synthesized in Synthetic example 1 (d) and 1.77 g of N,N-diethylthiobarbituric acid were added to 30 ml of pyridine, and stirred with heating to the inner temperature of 50° C. for 30 minutes. Then, 200 ml of ethyl acetate was added to the reaction solution and deposited crystals were collected by filtration. The crystals were added to a mixed solvent of methanol (100 ml)/chloroform (200 ml) and dissolved therein under reflux with heating. The insoluble matters were filtered out in hot state, and the filtrate was concentrated to 120 ml under reduced pressure. After being allowed to stand at room temperature, obtained crystals were collected by filtration, washed with methanol and dried.

Red crystals 1 g (Yield 29.2%), Melting point 300° C. or more, λmax=530 nm ($\epsilon=5.18\times10^4$) (methanol).

Synthetic example 4

Synthesis of (59)

First, 3 g of 3-methyl-2-methylthiocycloheptimidazolium trifluoromethanesulfonate as synthesized in Synthetic example 1 (d) and 2.1 g of N,N-di-n-butyl-barbituric acid were added to 30 ml of pyridine, and stirred with heating to the inner temperature of 50° C. for one hour. Then, 200 ml of water was added to the reaction solution and deposited crystals were collected by filtration. The crystals were dissolved in a mixed solvent of isopropanol (100 ml)/chloroform (100 ml), the insoluble matters were filtered out, and the filtrate was concentrated to 100 ml under reduced pressure. After being allowed to stand to room temperature, deposited crystals were collected by filtration, washed with isopropanol and dried.

Red crystals 1.06 g (Yield 28.0%), Melting point 219° to 221° C., λmax=516 nm ($\epsilon=4.59\times10^4$) (methanol).

Synthetic example 5

Synthesis of (49)

First, 5 g of 3-methyl-2-methylthiocycloheptimidazolium trifluoromethanesulfonate as synthesized in Synthetic example 1 (d) and 0.84 g of malonic acid were added to 50 ml of pyridine, and refluxed with heating for 30 minutes. Then, 200 ml of water was added to the reaction solution, followed by addition 2.2 g of sodium iodide. Deposited crystals were collected by filtration, and purified by silica gel column chromatography using a mixed solvent of methanol/chloroform=¼ as a developing solvent. The resulting crystals were dissolved in a mixed solvent of methanol (50 ml)/chloroform (50 ml) and the insoluble matters were filtered out. The filtrate was concentrated to 60 ml and allowed to cool. Deposited crystals were collected by filtration, washed with methanol and dried.

Purple crystals 1.1 g (Yield 14.4%), Melting point 300° C. or more, λmax=674 nm ($\epsilon=6.49\times10^4$) (methanol).

Synthetic example 6

Synthesis of (50)

First, 10 g of 3-methyl-2-methylthiocycloheptimidazolium trifluoromethanesulfonate as synthesized in Synthetic example 1 (d) and 3.82 g of glutaconic acid were added to 50 ml of pyridine, and stirred with heating to the inner temperature of 50° C. for one hour. Then, 200 ml of ethyl acetate was added to the reaction solution, and deposited crystals were collected by filtration. The crystals were dissolved in 1 of methanol under reflux with heating and the insoluble matters were filtered out. Then, a solution of 1 g of sodium iodide in 50 ml of methanol was added to the filtrate, and concentrated to 200 ml. Deposited crystals were collected by filtration, washed with methanol and water, and dried.

Deep purple crystals 2 g (Yield 12.5%), Melting point decomposed at about 200° C., λmax=774 nm ($\epsilon=1.14\times10^5$) (methanol).

Synthetic example 7

Synthesis of (77)

First, 3 g of 3-methyl-2-methylthiocycloheptimidazolium trifluoromethanesulfonate as synthesized in Synthetic example 1 (d) was added to 30 ml of acetonitrile, 1.5 ml of triethylamine was further added, and the mixture was stirred with heating to the inner temperature of 60° C. for one hour. After the reaction, solvent was distilled away, and the resulting crystals were purified by silica gel column chromatography using a mixed solvent of methanol/chloroform=¼ as a developing solvent. The resulting crystals were dissolved in 10 ml of methanol, and a solution of 0.7 g of sodium iodide in 3 ml of methanol was added. After further addition of 100 ml of water, deposited crystals were collected by filtration, washed with methanol and dried.

Red crystals 0.5 g (Yield 13.7%), Melting point 219° to 221° C., λmax=522 nm ($\epsilon=8.12\times10^4$) (methanol).

Synthetic example 8

Synthesis of (4)

Synthesis of (4) is stated below successively from synthesis of a raw material of the dye.

(a) Synthesis of 2-methoxycycloheptimidazole

First, 3 g of 2-methylthiocycloheptimidazole as synthesized according to Synthetic example 1 (c) with reference to the method disclosed in Bulletin of the Chemical Society of Japan, volume 33, No. 1, pages 56 to 58 (1960) was added to 50 ml of methanol, and 1 g of sodium methoxide was further added thereto. After reflux with heating for 10 hours, the solvent was distilled away, and 50 ml of benzene was added to the residue. The insoluble matters were filtered out, and the filtrate was concentrated. The resulting crystals were purified by silica gel column chromatography using ethyl acetate as a developing solvent.

Colorless crystals 1 g (Yield 36.8%), Melting point 94° C.

(b) Synthesis of 2-methoxy-3-methylcycloheptimidazolium trifluoromethanesulfonate First, 0.9 g of 2-methoxycycloheptimidazole was added to 5 ml of anisole, and 1.1 g of methyl trifluoromethanesulfonate was added dropwise. After being stirred at room temperature for one hour, 30 ml of ethyl acetate was added, and deposited crystals were collected by filtration and dried.

Colorless crystals 1.1 g (Yield 60.4%), Melting point 123° to 124° C.

(c) Synthesis of (4)

2-Methoxy-3-methycycloheptimidazolium trifluoromethanesulfonate (1 g) and 1.08 g of 3-ethty-2-methylbenzothiazolium p-toluenesulfonate were added to 30 ml of acetonitrile, 0.86 ml of triethylamine was further added, and the mixture was refluxed with heating for 40 minutes. Solvent was distilled away, and the residue was subjected to purification by silica gel column chromatography using a mixed solvent of methanol/chloroform=¼ as a developing solvent.

The resulting crystals were dissolved in 50 ml of methanol, the insoluble matters were filtered out in a hot state, and then a solution of 0.5 g of sodium iodide in 5 ml of methanol was added to the filtrate. Deposited crystals were collected by filtration, washed successively with methanol and water, and dried.

Red crystals 0.2 g (Yield 13.9%), Melting point 190° to 191° C., λmax=557 nm (ε=1.04×10$^5$) (methanol).

Synthetic example 9

Synthesis of (3)

Synthesis of (3) is stated below in order from synthesis of a raw material of the dye.

(a) Synthesis of --hydroxycycloheptimidazole

First, 60 g of 2-methylthiocycloheptimidazole as synthesized according to Synthetic example 1 (c) with reference to the method disclosed in Journal of the American Chemical Society, vol. 76, pages 3352 and 3353 (1954) was added to 300 ml of concentrated hydrochloric acid (hydrogen chloride 35%), and refluxed with heating for 2 hours and 30 minutes. Then, 500 ml of ethanol was added, and after stirring at room temperature, deposited crystals were collected by filtration. The crystals were dissolved in 0.5 of water, and pH was adjusted to around 7 with sodium bicarbonate. Deposited crystals were collected by filtration, washed with water and dried.

Pale yellow crystals 40 g (Yield 80.3%), Melting point 245° C.

(b) Synthesis of 2-chlorocycloheptimidazole

With reference to the method disclosed in Chemical and Pharmaceutical Bulletin, vol. 16, No. 7, pages 1300 to 1307 (1968), 10 g of 2-hydroxycycloheptimidazole, 150 g of phosphorus oxychloride and 12 g of N,N-diethylaniline were stirred with heating to the inner temperature of 70° C. for 6 hours and 30 minutes. After the reaction, phosphorus oxychloride was distilled away under reduced pressure and 500 ml of ice water was added to the residue. Then, a sodium bicarbonate solution was added thereto to neutral pH, and extracted with chloroform (250 ml×2). The chloroform layer was dried over anhydrous sodium sulfate, solvent was distilled away, and the residue was purified by silica gel column chromatography using ethyl acetate as a developing solvent.

Colorless crystals 2.7 g (Yield 24%), Melting point 162° to 163° C.

(c) Synthesis of 2-chloro-3-methylcycloheptimidazolium trifluoromethanesulfonate 2-Chlorocycloheptimidazole (0.78 g) was added to 4 ml of anisole, 0.93 g of methyl trifluoromethanesulfonate was added dropwise thereto, and the mixture was stirred at room temperature for 40 minutes. Then, 50 ml of ethyl acetate was added to the reaction solution, and deposited crystals were collected by filtration and dried.

Colorless crystals 1.27 g (Yield 81.5%), Melting point 109° to 110° C.

(d) Synthesis of (3)

First, 1,2 g of 2-chloro-3-methylcycloheptimidazolium trifluoromethanesulfonate and 1.28 g of 3-ethyl-2-methylbenzothiazolium p-toluenesulfonate were added to 30 ml of acetonitrile, 1 ml of triethylamine was further added, and the mixture was refluxed with heating for one hour and 30 minutes. After the reaction, solvent was distilled away therefrom, and the residue was purified by silica gel column chromatography using a mixed solvent of methanol/chloroform=¼ as a developing solvent. The resulting crystals were dissolved in 100 ml of methanol, the insoluble matters were filtered out, and a solution of 0.6 g of sodium iodide in 5 ml of methanol was added to the filtrate. After being allowed to stand at room temperature for a while, deposited crystals were collected by filtration, washed with a small amount of methanol and dried.

Red crystals 100 mg (Yield 5.7%), Melting point decomposed at 120° C., λmax=522 nm (4.32×10$^4$) (methanol).

Synthetic example 10

Synthesis of (1)

Synthesis of (1) is stated below in turn from synthesis of the starting substance of the dye.

(a) Synthesis of cycloheptimidazole

With reference to Journal of the American Chemical Society, vol. 76, pages 3352 and 3353 (1954), 23 g of 2-mercaptocycloheptimidazole as synthesized in Synthetic example 1 (b) was added to 210 ml of 10% nitric acid, and stirred with heating to the inner temperature of 80° to 90° C. for one hour. The reaction solution was neutralized with sodium bicarbonate and extracted with chloroform (250 ml×2). The chloroform layer was dried over anhydrous sodium sulfate and concentrated to 50 ml under reduced pressure, and then 200 ml of hexane was added. Deposited crystals were collected by filtration and dried.

Pale yellow crystals 7 g (Yield 38.5%), Melting point 120° C.

(b) Synthesis of (1)

First, 3.8 g of cycloheptimidazole was added to 20 ml of anisole, 7.2 g of methyl trifluoromethanesulfonate was added dropwise and the mixture was stirred at room temperature for 30 minutes. Precipitated oily matter was taken out by decantation. The whole oily matter and 5.1 g of 3-ethyl-2-methylbenzothiazolium p-toluenesulfonate were added to 50 ml of acetonitrile, and 4 ml of triethylamine was further added. The mixture was refluxed with heating for one hour and solvent was distilled away. The resulting crude product was purified twice by silica gel column chromatography using a mixed solvent of methanol/chloroform=¼ as a developing solvent. Then, 50 ml of methanol was added to the resulting crystals to dissolve it, and a solution of 1.5 g of sodium iodide in 5 ml of methanol was added. After being allowed to stand for a while, deposited crystals were collected by filtration, washed with methanol and dried.

Red crystals 0.5 g (Yield 3.8%), Melting point 288° to 290° C., λmax=550 nm ($\epsilon=5.98\times10^4$) (methanol).

Synthetic example 11

Synthesis of (2)

(A Synthetic Method Different from Synthetic Example 1)

Synthesis of (2) is stated below in turn from synthesis of the starting substance of the dye.

(a) Synthesis of 2-methoxy-5-methyl-2,4,6-cycloheptatrien-1-one

2-Hydroxy-5-methyl-2,4,6-cycloheptatrien-1-one (223 g) as obtained by the method disclosed in Bulletin of the Chemical Society of Japan, vol. 32, pages 493 to 496 (1959) and 340 g of potassium carbonate were added to 1.3 l of acetone containing 10% water, 310 g of dimethyl sulfate was added thereto, and the mixture ws refluxed with heating for 7 hours. After being allowed to stand overnight, deposited inorganic matters were filtered out and acetone in the filtrate was distilled away under reduced pressure. Then, 1 l of water was added to the resulting concentrate, and extracted with chloroform (0.25 l×4).

The chloroform layer was dried over anhydrous sodium sulfate, evaporated to distil away the solvent and distilled under reduced pressure (130° C./0.5 mmHg).

Colorless liquid 224 g (Yield 91%).

(b) Synthesis of 2-mercapto-6-methylcycloheptimidazole

2-Methoxy-5-methyl-2,4,6-cyclpoheptatrien-1one (165 g) and 84 g of thiourea were added to 255 g of a 28% sodium methoxide methanol solution, and stirred at room temperature for 30 minutes. Then, 600 ml of methanol was added and acetic acid was added until pH of the solution becomes around 5. Deposited crystals were collected by filtration, throughly washed with methanol and dried.

Yellow crystals 145.4 g (Yield 75%), Melting point 300° C. or more.

(c) Synthesis of 6-methyl-2-methylthiocycloheptimidazole

First, 38 g of potassium hydroxide was dissolved in 800 ml of methanol, 108.5 g of 2-mercapto-6-methycycloheptimidazole was added, and the mixture was stirred with heating to the inner temperature of about 45° C. Then, 131.2 g of dimethyl sulfate was added dropwise thereto and stirred with heating to the inner temperature of about 45° C. for one hour. After the solvent was distilled away in some extent under reduced pressure, 1 l of water was added and extracted with chloroform (0.5 l×2). The chloroform layer was dried over anhydrous sodium sulfate and evaporated to 200 ml under reduced pressure to distil away the solvent. With the addition of 1 l of hexane, crystals were deposited, and they were collected by filtration and dried.

Colorless crystals 99.6 g (Yield 85.0%), Melting point 110° to 111° C.

(d) Synthesis of 3,6-dimethyl-2-methylthiocycloheptimidazoliumtrifluoromethanesulfonate 6-Methyl-2-methylthiocycloheptimidazole (27 g) was added to 100 ml of anisole and stirred under ice cooling. Then, 28 g of methyl trifluoromethanesulfonate was added dropwise thereto, and stirred under ice cooling. The mixture was further stirred at room temperature for one hour, 200 ml of ethyl acetate was added, and deposited crystals were collected by filtration and dried.

Colorless crystals 40.3 g (Yield 80%), Melting point 175° to 177° C.

(e) Synthesis of (2)

3,6-Dimethyl-2-methylthiocycloheptimidazolium trifluoromethanesulfonate (3 g) and 3.4 g of 3-ethyl-2-ethylthiobenzothiazolium p-toluenesulfonate were added to 50 ml of acetonitrile, 2.4 ml of triethylamine was added thereto, and the mixture was stirred with heating to the inner temperature of 45° C. for one hour. After the reaction, 200 ml of ethyl acetate was added and deposited crystals were collected by filtration. The crystals were added to 100 ml of methanol and heated to dissolve it, and the insoluble matters were filtered out in a hot state. A solution of 1.5 g of sodium iodide in 10 ml of methanol was added to the filtrate, and allowed to stand. Deposited crystals were collected by filtration, successively washed with methanol and water, and dried.

Purple crystals 1.5 g (Yield 35.9%), Melting point 260° to 264° C.

Synthetic example 12

Synthesis of (7)

(A synthetic method different from Synthetic example 2)

3,6-Dimethyl-2-methylthiocycloheptimidazolium trifluoromethanesulfonate (3 g) as synthesized in Synthetic example 1 (d) and 3.3 g of 3-ethyl-2-ethylthiobenzoxazolium p-toluenesulfonate were added to 50 ml of acetonitrile, 2.4 ml of triethylamine was added thereto, and the mixture was stirred with heating to the inner temperature of 40° C. for one hour. After the reaction, 200 ml of ethyl acetate was added and deposited crystals were collected by filtration. The crystals were added to 150 ml of methanol and dissolved therein with heating, and the insoluble matters were filtered out in a hot state. A solution of 1.5 g of sodium iodide in 10 ml of methanol was added to the filtrate and allowed to cool. Deposited crystals were collected by filtration, successively washed with methanol and water, and dried.

Purple crystals 2.4 g (Yield 59%), Melting point 300° C. or more.

Synthetic example 13

Synthesis of (10)

3,6-Dimethyl-2-methylthiocycloheptimidazolium trifluoromethanesulfonate (3 g) as synthesized in Synthetic example 11 (d) and 5 g of 2-(2-acetanilidovinyl)-3-ethylbenzothiazolium p-toluenesulfonate were added to 50 ml of methanol, 2.4 ml of triethylamine was further added, and the mixture was stirred at room temperature for 2 hours. A solution of 1 g of sodium iodide in 10 ml of methanol was added thereto, and stirred for a while to deposit crystals.

The crystals were collected by filtration, added to 200 ml of methanol and dissolved therein under reflux with heating. The resulting insoluble matters were filtered out in a hot state, and the filtrate was allowed to cool. Deposited crystals were collected by filtration, washed with methanol and dried.

Purple crystals 2.5 g (Yield 56.8%), Melting point 215° to 216° C., λmax=672 nm (ε=1.02×10⁵) (methanol).

Synthetic example 14

Synthesis of (60)

3,6-Dimethyl-2-methylthiocycloheptimidazolium trifluoromethanesulfonate (3 g) as synthesized in Synthetic example 11 (d) and 3.1 g of 5-(acetanilidomethylidene)-3-ethylrhodanine were added to 100 ml of methanol, 2.4 ml of triethylamine was further added, and the mixture was stirred at room temperature for one hour.

Deposited crystals were collected by filtration, 200 ml of methanol was added to them, and the mixture was refluxed with heating to dissolve them. The insoluble matters were filtered out and the filtrate was allowed to cool. Deposited crystals were collected by filtration, washed with methanol and dried.

Purple crystals 2.1 g (Yield 66.0%), Melting point 151° to 152° C., λmax=621 nm (ε=5.20×10⁴) (methanol).

Synthetic example 15

Synthesis of (10)

(A synthetic method different from Synthetic example 13)

Synthesis of (10) is stated below in turn from synthesis of the starting substance of the dye.

(a) Synthesis of 6-(2-acetanilidovinyl)-3-methyl-2-methylthiocycloheptimidazolium trifluoromethanesulfonate 3,6-Dimethyl-2-methylthiocycloheptimidazolium trifluoromethanesulfonate (10 g) as synthesized in Synthetic example 11 (d) and 8.3 g of N,N'-diphenylformamidine were added to 150 ml of acetic anhydride, and stirred with heating to the inner temperature of about 90° C. for one hour. After being allowed to cool, 150 ml of ethyl acetate was added thereto, and deposited crystals were collected by filtration and dried.

Yellow crystals 12 g (Yield 85.1%), Melting point 162° to 163° C.

(b) Synthesis of (10)

6-(2-acetanilidovinyl) -3-methyl-2-methylthiocycloheptimidazolium trifluoromethanesulfonate (4 g) and 2.5 g of 3-ethyl-2-methylbenzothiazolium p-toluenesulfonate were added to 50 ml of methanol, 2.2 ml of triethylamine was added and the mixture was stirred at room temperature for one hour. Post-treatment was conducted in the same manner as in Synthetic example 13.

Purple crystals 2.7 g (Yield 73.0%), Melting point 215° to 216° C.

Synthetic example 16

Synthesis of (60)

(A synthetic method different from Synthetic example 14)

6-(2-Acetanilidovinyl)-3-methylthiocycloheptimidazolium trifluoromethanesulfonate (4 g) as synthesized in Synthetic exampel 15 (a) and 1.16 g of 3-ethylrhodanine were added to 100 ml of methanol, 2.2 ml of triethylamine was further added, and the mixture was stirred at room temperature for one hour. Thereafter, treatment similar to those in Synthetic example 14 were conducted.

Purple crystals 2.3 g (Yield 85.2%), Melting point 151° to 152° C.

Synthetic example 17

Synthesis of (45)

3,6-Dimethyl-2-methylthiocycloheptimidazolium trifluoromethanesulfonate (5 g), 1.66 g of N,N'-diphenylformamidine and 2 ml of acetic anhydride were added to 100 ml of methanol, 3.9 ml of triethylamine was further added, and the mixture was stirred at room temperature for one hour. A solution of 1 g of sodium iodide in 10 ml of methanol was added to the reaction solution. After stirring for a while, deposited crystals were collected by filtration and dissolved in 100 ml of methanol through reflux with heating, and the insoluble matters were filtered out in a hot state.

The filtrate was allowed to cool, and deposited crystals were collected by filtration, washed with methanol and dried.

Purple crystals 2.1 g (Yield 54.5%), Melting point 140° to 141° C., λmax=825 nm (ε=1.21×10⁵) (methanol).

Structure Determination

All the dyes of the present invention as synthesized in Synthetic examples 1 to 17 exhibited molecular ion (parent) peak in mass spectra. Further, coincides of elementary analyses were observed.

The following are ¹H-Nmr data of some dyes. All the measurements were conducted using 400 MHz-¹H-Nmr and DMSO-d⁶ solvent.

(1): Measuring temperature 373K.

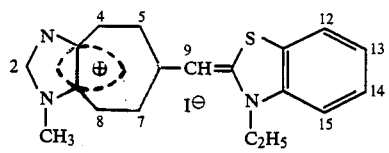

δppm, JinHz: 1.45 (3 H, t, J=8, N—CH₂—C$\underline{H}$₃), 3.93 (3 H, s, N—C$\underline{H}$₃), 4.67 (2 H, q, J=8, N—C$\underline{H}$₂CH₃), 6.90 (1 H, S, H-9), 7.55–7.66 (4 H, m, H-13 (or 14), 3 H among H-4, 5, 7, 8), 7.73 (1 H, td, J=8, 0.5, H-14 (or 13)), 7.83 (1 H, dd, J=12, 1 H among H-4, 5, 7, 8), 7.95 (1 H, d, J=8, H-15), 8.17 (1 H, d, J=8, H-12), 8.33 (1 H, s, H-2).

(2); Measuring temperature 333K.

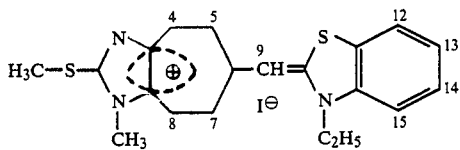

δppm, JinHz: 1.41 (3 H, t, J=8, N-CH$_2$CH$_3$), 2.79 (3 H, s, S—CH$_3$), 3.78 (3 H, s, N—CH$_3$), 4.62 (2 H, q, J=8, N-CH$_2$CH$_3$), 6.88 (1 H, S, H-9), 7.54 (1 H, t, J=8, H-14 (or 13)), 7.67 (2 H, d, J=12, H-5, 7 (or 4,8)), 7.69 (1 H, t, J=8, H-13 (or 14)), 7.88 (2 H, d, J=12, H-4, 8 (or 5, 7)), 7.90 (1 H, d, J=8, H-15), 8.14 (1 H, d, J=8, H-12).

(7): Measuring temperature 373 K.

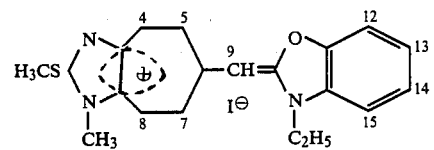

δppm, JinHz: 1.44 (3 H, t, J=7, N—CH$_2$CH$_3$), 2.79 (3H, s, S—CH$_3$), 3.79 (3 H, s, N—CH$_3$), 4.38 (2 H, q, J=7, N—CH$_2$CH$_3$), 6.22 (1 H, S, H-9), 7.48 (1 H, td, J=8, 1, H-14 (or 13)), 7.54 (1 H, td, J=8, 1, H-13 (or 14)), 7.73 (1 H, dd, J=8, 1, H-15), 7.79 (1 H, dd, J=8, 1, H-12), 7.85–7.89 (2 H, m, H-5, 7 (or 4, 8)), 7.91–8.02 (2 H, bm, H-4, 8 (or 5, 7)).

(49): Measuring temperature 373K

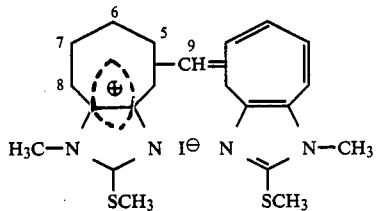

δppm, JinHz: 2.84 (6 H, s, —SCH$_3$), 3.82 (6 H, s, N—CH$_3$), 7.36 (2 H, t, J=12, H-7), 7.47 (2 H, t, J=12, H-6), 7.84 (2 H, d, J=12, H-5), 8.22 (2 H, d, J=12, H-8), 8.44 (1 H, S, H-9).

Further, Nucleus Overhauser Effect (NOE) was observed between N—CH$_3$ and H-8.

(50): Measuring temperature 373K

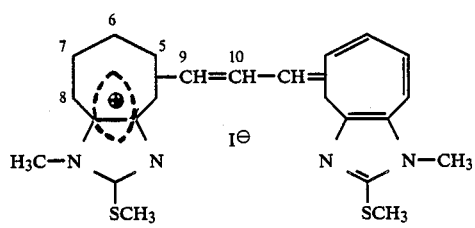

δppm, JinHz: 2.88 (6 H, s, —SCH$_3$), 3.77 (6 H, s, N—CH$_3$), 7.19 (2 H, t, J=12, H-7), 7.27 (2 H, t, J=12, H-6), 7.33 (2 H, d, J=13, H-9), 7.66 (2 H, d, J=12, H-5), 8.18 (2 H, d, J =12, H-8), 9.10 (1 H, bt, J=13, H-10).

(58): Measuring temperature 323K

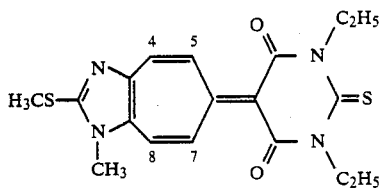

δppm, JinHz: 1.20 (6 H, t, J=8, N—CH$_2$CH$_3$), 2.86 (3 H, s, —SCH$_3$), 3.88 (3 H, s, N—CH$_3$), 4.48 (4 H, q, J=8, N—CH$_2$CH$_3$), 8.43 (1 H, d, J=12, H-5 or 7 (or 4 or 8)), 8.46 (1 H, d, J=12, H-5 or 7 (or 4 or 8)), 9.17 (1 H, d, J=12, H-4 or 8 (or 5 or 7)), 9.20 (1 H, d, J=12, H-4 or 8 (or 5 or 7)).

(59): Measuring temperature 323K

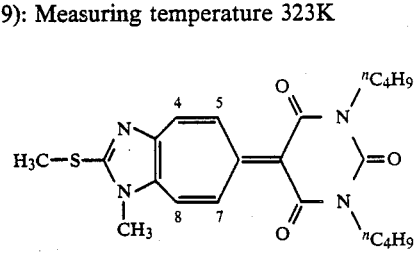

δppm, JinHz: 0.89 (6 H, t, J=8, —N(CH$_2$)$_3$CH$_3$), 1.28 (4 H, qt, J=8, NCH$_2$CH$_2$CH$_2$CH$_3$), 1.52 (4 H, tt, J=8, NCH$_2$CH$_2$CH$_2$CH$_3$), 2.82 (3 H, s, —SCH$_3$), 3.83 (3 H, s, —NCH$_3$), 3.83 (4 H, t, J=8, NCH$_2$CH$_2$CH$_2$CH$_3$), 8.23 (1 H, d, J=12, H-5 or 7 (or 4 or 8)), 8.25 (1 H, d, J=12, H-5 or 7 (or 4 or 8)), 9.18 (1 H, d, J=12, H-4 or 8 (or 5 or 7)), 9.22 (1 H, d, J=12, H-4 or 8 (or 5 or 7)).

(77): Measuring temperature 298K

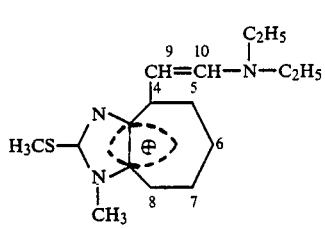

δppm, JinHz: 1.23 (3 H, t, J=8, N—CH$_2$—CH$_3$), 1.26 (3 H, t, J=8, N—CH$_2$—CH$_3$), 2.77 (3 H, s, S—CH$_3$), 3.60 (2 H, q, J=8, N—CH$_2$CH$_3$), 3.65 (2 H, q, N—CH$_2$CH$_3$), 3.73 (3 H, s, N—CH$_3$), 6.07 (1 H, d, J=13, H-10), 7.36 (1 H, t, J=12, H-7), 7.67 (1 H, d, J=12, H-5), 7.75 (1 H, t, J=12, H-6), 7.91 (1 H, d, J=12, H-8), 8.50 (1 H, t, J=13, H-9).

In use as a sensitizing agent and a sensitizing dye (hereinafter merely referred to as a sensitizing dye) or a desensitizing agent and a desensitizing dye (hereinafter merely referred to as a desensitizing dye), a methine dye represented by the general formula (I) (preferably the general formula (II), (III), (IV), (V), (VI), (VII), (VIII), or (IX)) is used in an amount of $5 \times 10^{-7}$ to $1 \times 10^{-2}$, preferably $5 \times 10^{-6}$ to $5 \times 10^{-3}$ moles per 1 mole of silver halide, when the dye is contained in a silver halide light-sensitive material layer. Optimum amount thereof depends on chemical structure of the sensitizing or desensitizing dye to be used, and crystal habit and grain size of the silver halide light-sensitive material. Further, these sensitizing or desensitizing dyes may be incorporated in any of the stages for preparation of a silver halide light-sensitive material such as stages of grain formation, physical ripening, chemical ripening and the like, or these dyes may be added to a coating solution before it is applied. Further, the above addition methods may be used together.

A methine dye used in the invention can directly be dispersed in a light-sensitive material or a hydrophilic colloidal solution. Further, it may be incorporated in a light-sensitive material in a form of solutions in a proper solvent such as methyl alcohol, ethyl alcohol, propyl alcohol, methyl cellosolve, a halogenated alcohol disclosed in Japanese Patent Unexamined Published Application (hereinafter referred to as "J.P. KOKAI") No. 48-9715 or U.S. Pat. No. 3,756,830, acetone, water, pyridine or the like or a mixed solvent thereof. As other usable addition methods, methods disclosed in J.P. KOKOKU No. 46-24185, and U.S. Pat. Nos. 3,822,135, 3,660,101, 2,912,343, 2,996,287, 3,429,835 and 3,658,546 may be mentioned. Further, methods disclosed in West Germany Patent Application No. 2,104,283 and U.S. Pat. No. 3,649,286 may also be used.

Further, methine dyes of the invention can be used as various photographic dyestuffs such as filter dyestuffs, irradiation inhibiting dyestuffs, antihalation dyestuffs or the like for the purpose of enhancement or sharpness, color-separating ability or the like.

The methine dyes for the purposes may be contained according to conventional manners in coating solutions for silver halide photographic light-sensitive material layers, filter layer and/or antihalation layer, or the like. A methine dye of the invention as a photographic dyestuff may be used in enough amount to color a photographic layer, and one skilled in the art can appropriately readily determine a specific amount in accordance with use purpose. In general, the methine dye for the purpose is preferably used so that its optical density comes to a range of 0.05 to 3.0.

Addition of the dyestuff may be done at any step before application of the coating solution.

Further, it is also possible to localize a dyestuff in a desired layer through interaction with the dyestuff molecules as generated by coexisting as a mordant a polymer having an opposite charge to that of the dyestuff ion.

Examples of such a polymer mordant include, for example, those disclosed in U.S. Pat. Nos. 2,548,564, 4,124,386, 3,625,694, 3,958,995, 4,168,976 and 3,445,231.

Silver halide light-sensitive materials usable in the present invention may be any of silver bromide, silver iodobromide, silver iodochlorobromide, silver chlorobromide and silver chloride. Preferred silver halides are silver bromide, silver chlorobromide, silver iodobromide and silver iodochlorobromide.

Silver halide grains in the photographic light-sensitive materials may be those which have a regular crystal shape such as cubic, octahedron, tetradecahedron, or the like, or those having an irregular crystal shape such as sphere, tabular or the like, or those having a composite shape of these crystal shapes, or may further be composed of mixture of grains having various crystal shapes.

Silver halide grains to be used in the invention may be tabular grains which have a thickness of 0.5μ or less, preferably 0.3μ or less, and preferably have a diameter of 0.6μ or more, and wherein grains having an average aspect ratio of 5 or more occupy 50% or more of total projected area. Further, the silver halide grains may be monodispersed grains wherein grains having grain sizes within ±40% of the average grain size occupy 95% or more of total grain number.

Silver halide grains for the invention may have different phases between the inner part and the surface layer, or may be composed of a homogeneous phase through them. Further, the grains may be those wherein latent images are mainly formed on the surface (for example, negative type light-sensitive materials), those wherein latent images are mainly formed inside the grains (for example, internal latent image type light-sensitive materials), or those which previously fogged (for example, direct positive type light-sensitive materials).

Silver halide grains having the abovementioned various halogen compositions, crystal habits, intragrain structures, shapes and distributions may be used in light-sensitive photographic elements of various uses. Thus, methine dyes of the invention may be used for such purposes as sensitizing agents, sensitizing dyes, desensitizing agents, desensitizing dyes, filter, antihalation, irradiation inhibition or the like together with light-sensitive materials having such uses as hereinafter stated. These dyes may be incorporated in desired layer(s) such as intermediate layer(s), protective layer(s), back layer(s) or the like besides light-sensitive material layer(s).

Methine dyes of the invention may be used together with silver halide photographic light-sensitive materials for various color or black-and-white light-sensitive materials.

More specifically, these dyes may be used together with light-sensitive materials for color positive films, light-sensitive materials for color papers, light-sensitive materials for color negative films, light-sensitive materials for color reversal films (coupler is contained or not contained), silver halide photographic light-sensitive materials for direct positive films, light-sensitive materials for photographic light-sensitive materials for making printing plates (for example, litho-films, litho-duplicating films and the like), light-sensitive materials used in light-sensitive materials for cathode ray tube display, light-sensitive materials used in light-sensitive materials for X-ray recording (particularly, materials for direct or indirect photographing using a screen), light-sensitive materials in silver salt diffusion transfer process, light-sensitive materials used in color diffusion transfer process, light-sensitive materials in imbibition transfer process, light-sensitive materials used in silver dye bleach process, light-sensitive materials used in light-sensitive materials for heat development, or the like.

Photographic light-sensitive materials used in the present invention may be prepared according to methods disclosed in P. Glafkides, Chimie et Physique Photographique, published by Paul Montel Co., 1967; G. F. Duffin, Photographic Emulsion Chemistry, published by The Focal Press, 1966; V. L. Zelikman et al., Making and Coating Photographic Emulsion, published by The Focal Press, 1964 and the like.

Further, in order to control growth of grains during formation of silver halide grains, a silver halide-dissolving agent, for example ammonia, potassium thiocyanate, ammonium thiocyanate, a thioether compound (disclosed for example in U.S. Pat. No. 3,271,157, 3,574,628, 3,704,130, 4,297,439, 4,276,374 or the like), a thione compound (disclosed for example in J.P. KOKAI No. 53-144319, 53-82408, 55-77737 or the like), an amine compound (disclosed for example in J.P. KOKAI No. 54-100717 or the like), or the like may be used.

In a stage of formation or physical ripening of silver halide grains, a cadmium salt, a zinc salt, a thallium salt, an iridium salt or a complex salt thereof, rhodium salt or a complex salt thereof, an iron salt or an iro complex salt, or the like is made to coexist.

Internal latent image type light-sensitive materials used in the invention include, for example, conversion type light-sensitive materials disclosed in U.S. Pat. Nos. 2,592,250, 3,206,313, 3,447,927, 3,761,276, 3,935,014 and the like; core/shell type light-sensitive materials; light-sensitive materials containing dissimilar metals; and the like.

Next, as previously fogged direct positive type light-sensitive materials usable in the invention, silver halide light-sensitive materials for direct positive films which were previously fogged with light or chemical fogging agents may be mentioned.

In general, these light-sensitive materials are classified into the following two types.

Light-sensitive materials of one of the types are those which have inside the silver halide crystals nuclei capable of trapping free electrons, and whose surfaces are previously chemically fogged. Characteristic of light-sensitive materials of this type lies in that they themselves directly give positive images, and in light-sensitive materials of this type high sensitization as well as sensitization in intrinsic absorption region owing to spectral sensitizing action may be given by adding sensitizing dyes. In light-sensitive materials of this type, halogen comositions must be adjusted so that chemical sensitizing agents or salts of metals of the VIII group or te like used for giving free electron-trapping nucleus are made to be readily incorporated in silver halide crystals. Further, improvement of fog in exposed areas, particularly formation of negative images due to excess exposure may be done by adding an organic desensitizing dye. Furhter, increase of maximum density, high sensitization and improvement of falling out may be done by adding bromide ions or iodide ions.

Light-sensitive materials of the other type are those which do not have any free electron-trapping nucleus inside the silver halide crystals and wherein surfaces of the silver halide crystals are previously chemically fogged. Light-sensitive materials of this type are silver halide light-sensitive materials composed of regular crystals which scarcely contain crystal defects, and preferably consist of pure silver bromide and do not have twinning plane. These light-sensitive materials themselves do not give any direct positive image. However, direct positive images of high sensitivity may be obtained by adsorbing an organic desensitizing agent on silver halide of this light-sensitive material.

Light-sensitive materials of both types may be used in the invention. That is, either of the two type light-sensitive materials may effectively be sensitized with methine dyes.

Internal latent image type silver halide light-sensitive materials are fogged with light or chemically fogged, and chemically fogged nuclei are brought about by addition of a reductive organic compound, for example, a hydrazine series derivative, formalin, a polyamine compound, an amineborane, methyldichlrosilane or the like.

A method for giving fog nuclei by using a reducing agent together with ion of metal nobler than silver (for example, gold ion, platinum ion, iridium ion or the like), or by using a reducing agent together with an above metal ion and halogen ion may also be applied.

Silver halide light-sensitive materials are usually chemically sensitized. For chemical sensitization, a method disclosed, for example, in Die Grundlagen der Photographischen Prozesse mit Silberhalo geniden, edited by H. Frieser, Akademische Verlagsgesellschaft, 1968, pages 675 to 734 may be used.

That is, a sulfur sensitization method using a sulfur-containing compound capable of reacting with an active gelatin or silver (for example, thiosulfate, a thiourea, a mercapto compound, a rhodanine), a reduction sensitization method using a reducing substance (for example, a tin (II) salt, an amine, a hydrazine derivative, formamidinesulfinic acid, a silane compound), a noble metal sensitization method using a noble metal compound (for example, a gold complex salt, a complex salt of metal of the VIII group in periodic table such as Pt, Ir or Pd), or the like may be used alone or in combination.

Various compounds may be contained in photographic light-sensitive materials to be used in the present invention for inhibiting fog in preparation steps thereof, during preservation thereof or during photographic process thereof or for stabilizing photographic performances. That is, various compounds known as antifoggants or stabilizing agents, for example thiazoles (for example, benzothiazolium salts); nitroindazoles; triazoles; benzotriazoles; benzimidazoles (particularly, nitro- or halogen-substituted benzimidazoles); heterocyclic mercapto compounds, for example mercaptothiazoles, mercaptobenzothiazoles, mercaptobenzimidazoles, mercaptothiadiazoles, mercaptotetrazoles (particularly, 1-phenyl-5-mercaptotetrazole), mercaptopyrimidines; the above heterocyclic mercapto compounds each having a water soluble group such as a carboxyl group or a sulfonic group; thioketone compounds (for example, oxazolinethione); azaindenes, for example tetrazaindenes (particularly, 4-hydroxy substituted (1,3,3a7) tetrazaindenes); benzenethiosulfonic acids; benzenesulfinic acids; or the like may be added.

Silver halide photographic light-sensitive materials of the invention may contain color-forming couplers such as cyan dye-forming couplers, magenta dye-forming couplers or yellow dye-forming couplers, and compounds which disperse couplers.

That is, compounds may be contained therein which may form dyes by oxidation coupling with aromatic primary amine developing agents (for example, phenylenediamine derivatives or aminophenol derivatives) in color developing process. For example, magenta dye-forming couplers include 5-pyrazolone coupler, pyrazolobenzimidazole coupler, cyanoacetylcoumarone coupler, open-chaned acylacetonitrile couplers, etc., yellow dye-forming couplers include acylacetamide couplers (for example, benzoylacetanilides, pivaloylacetanilides), etc., and cyan dye-forming couplers include naphthol couplers, phenol couplers, etc. These couplers are preferably couplers which each have a hydrophobic group called a ballast group and are non-diffusive. Either of 4-equivalent and 2-equivalent couplers based on silver ion may be used as dye-forming couplers. Further, dye-forming couplers may be colored couplers which have color correction effect or couplers which release development inhibitors with progress of development (so-called DIR couplers).

Further, photographic light-sensitive materials of the invention may contain besides DIR couplers colorless compound-forming DIR coupling compounds which form colorless coupling reaction products and release development inhibitors at the same time.

Photographic light-sensitive materials of the invention may contain for the purpose of sensitivity increase, contrast increase or development acceleration, for example polyalkylene oxides or derivatives thereof such as ethers, esters or amines; thioether compounds; thiomorpholine compounds; quaternary ammonium salts; urethane derivatives, urea derivatives; imidazole derivatives; 3-pyrazolidone derivatives; or the like.

Silver halide photographic light-sensitive materials of the invention may further contain known water soluble dyestuffs other than methine dyes of the invention (for example, oxonol dyestuffs, hemioxonol dyestuffs or merocyanine dyes) as filter dyestuffs or irradiation inhibitors or for other various purposes. Further, known cyanine dyes, merocyanine dyes, or himicyanine dyes other than methine dyes of the invention may be used together as spectral sensitizing dyes.

Photographic light-sensitive materials of the invention may contain various surfactants for various purposes such as coating aids, antistatic purpose, slipping improvement, emulsification and dispersion, adhesion inhibition, improvement of photographic performances (for example, development acceleration, contrast development, sensitization) or the like.

In practice of the invention, other additives may be used together with photographic light-sensitive materials or other hydrophilic colloids. For example, fading inhibitors, inorganic or organic hardening agents, anticolorfoggants, ultraviolet absorbers, mordants, plasticizers, latex polymers, matting agents or the like may be used. Specific examples of them are disclosed in Research Disclosure vol. 176 (1978, XI), D-17643 or the like.

Further, in photographic light-sensitive materials or the like used in the invention, hydrophilic polymers such as gelatin or the like may be used as protective colloids.

Finished light-sensitive materials are applied onto appropriate supports such as baryta papers, resin-coated papers, synthetic papers, triacetate films, polyethylene terephthalate films or other plastic bases or glass plates.

Exposure to light for obtaining photographic images may be carried out using usual methods. That is any of known various light sources such as natural light (sunlight), a tungsten lamp, a fluorescent lamp, a mercury lamp, a xenon arc lamp, a carbon arc lamp, a xenon flash lamp, cathode ray tube flying spot and the like. Exposure time may of cource be 1/1000 to one second used in an ordinal camera, may also be a time shorter than 1/1000 second, for example $1/10^4$ to $1/10^6$ second in case of using a xenon flash lamp or a cathode ray tube, and may further be a time longer than one second. It is possible, according to necessity, to adjust spectral composition of light used in exposure using a color filter. Laser lights may also be used for exposure. Further, exposure may be carried out by light emitted from fluorescent matters excited with electron ray, X ray, $\gamma$ ray, $\alpha$ ray or the like.

In photographic process of light-sensitive materials prepared using the present invention, both known methods and known processing solutions disclosed, for example, in Research Disclosure, No. 176, pages 28 to 30 (RD-17643) may be applied. This photographic process may be either of photographic process for forming silver images (black-and-white photographic process) and photographic process for forming dye images (color photographic process) according to purpose. Processing temperature is usually selected from 50° to 18° C., but may be a temperature lower than 18° C. or higher than 50° C.

The present invention is further explained by examples, but the scope of the invention should not be interpreted to be limited thereto.

EXAMPLE 1

(Negative type light-sensitive material)

A silver halide emulsion which comprises pure silver bromide and has a cubic crystal system, and a silver halide emulsion which has a octahedral crystal system were prepared. The silver halide emulsions were subjected to sulfur sensitization. Average dimer of silver halide grains as contained in these emulsions was $0.8\mu$, and 0.6 moles of silver halide was contained in 1 kg of the emulsion.

Then, 1 kg of each of the above 2 kinds of emulsions was each placed in a pot, methine dye (6), (22), (23) or (7) was added thereto, and the mixture was stirred at 40° C. Further, 4-hydroxy-6-methyl-1,3,3a,7-tetrazaindene (0.1 g/1 kg of the emulsion), 2,4-dichloro-6-hydroxy-1,3,5-dichlorotriazine sodium (0.1 g/1 kg of the emulsion) and sodium dodecylbenzenesulfonate (0.1 g/1 kg of the emulsion) were successively added thereto, and the mixture was applied onto a polyethylene terephthalate film base to obtain a photographic light-sensitive material.

Each of these samples was exposed to light using a diffraction grating type spectrograph in order to obtain a spectrogram.

After exposure to light, development was carried out at 20° C. for 4 minutes using a developing solution having the following composition.

| Composition of developing solution | |
|---|---|
| Water | 700 ml |
| Metol | 3.1 g |
| Anhydrous sodium sulfite | 45 g |
| Hydroquinone | 12 g |
| Sodium carbonate (monohydrate) | 79 g |
| Potassium bromide | 1.9 g |
| Water to | 1 l |

In use, water of 2 times the volume of the developing solution was added.

As the results, in the cubic emulsions, dye (6) spectrally sensitized the sample between 470 to 630 nm, and sensitization maximum lay between 580 to 600 nm; dye (22) spectrally sensitized the sample between 460 to 630 nm, and sensitization maximum lay between 580 to 600 nm; dye (23) spectrally sensitized the sample between 465 to 635 nm, and sensitization maximum lay between 585 to 605 nm; and dye (7) scarcely spectrally sensitized the sample, but only a slight sensitization maximum was observed around 575 nm.

In the octahedral emulsions, dyes (6), (22), (23) and (7) each exhibited sensitivities lower than those in the cubic emulsions, but exhibited similar spectral sensitivities.

EXAMPLE 2

(Direct positive light-sensitive material)

The 1st solution to the 4th solution having the following formulations, respectively were prepared in order to prepare light-sensitive materials.

| The 1st solution | |
|---|---|
| Inactive gelatin | 8 g |
| Aqueous potassium bromide solution (1 normal) | 5 ml |
| Water (60° C.) | 500 ml |
| The 2nd solution | |
| Silver nitrate | 100 g |
| Water (60° C.) | 500 ml |
| The 3rd solution | |
| Potassium bromide | 70 g |
| Water (60° C.) | 500 ml |
| The 4th solution | |
| Inactive gelatin | 75 g |
| Water | 300 ml |

The 2nd solution and the 3rd solution were added to the 1st solution over a period of 50 minutes, and physically ripened for further 5 minutes. Then, 15 ml of 0.2N potassium iodide solution was added and washed with water. The 4th solution was added and the mixture was adjusted to pH 6.0 with a silver nitrate solution. Hydrazine and a chloroacurate were added, pH was adjusted to 10 with a sodium hydroxide solution, and the mixture was ripened for 20 minutes. The resulting emulsion contained silver halide grains of cubic crystal system having an average grain size of about $0.24\mu$.

Then 100 g portions of this emulsion were weighed and placed in pots, methine dyes (25), (26), (31), (38), (7) and (1) were added thereto, respectively, and the mixtures were each mixed and stirred at 40° C. After addition of an appropriate amount of saponin, each emulsion was applied onto a cellulose triacetate film base to dry film thickness of about $5\mu$ to obtain a sample. Each sample was subjected to optical wedge exposure using a tungsten light source (2854° K.). Separately, each sample was exposed to light for obtaining a spectrogram using the above-mentioned diffraction grating type spectrograph.

Development was carried out at 20° C. for 2 minutes using a developing solution having the same composition as used in Example 1. The resulting sample was measured for optical density to obtain a characteristic curve.

As the results, dye (25) gave a reversal image wherein spectral sensitization is made between 445 to 615 nm and sensitization maximum lies between 565 to 585 nm.

Dye (31) gave a reversal image wherein spectral sensitization is made between 465 to 635 nm and sensitization maximum lies between 575 to 605 nm.

Dye (38) gave a reversal image wherein spectral sensitization is made between 460 to 630 nm and sensitization maximum lies between 570 to 600 nm.

Dye (7) had a sensitivity lower than those of dyes (25), (26), (31) and (38), but gave a reversal image wherein spectral sensitization is made between 460 to 610 nm and sensitization maximum lies between 575 to 585 nm.

Dye (1) also had a sensitivity lower than those of dyes (25), (26), (31) and (38), but gave a reversal image wherein spectral sensitization is made between 450 to 620 nm and sensitization maximum lies between 580 to 600 nm.

EXAMPLE 3

(Antihalation layer)

First, 80 g of gelatin was dissolved in 1 l of water, and 80 ml of an aqueous 5% polydiethylaminoethyl methacrylate solution, 30 ml of an aqueous 10% saponin solution, 50 ml of an aqueous 2% chromium alum solution and 400 ml of an aqueous 2% methine dye (54) solution were added thereto to prepare a gelatin solution of the dyestuff.

The gelatin solution was applied onto a cellulose acetate photographic support to prepare an antihalation layer. A silver chlorobromide emulsion (silver bromide about 17 mole%) as panchromatically spectrally sensitized with both anhydro-11-ethyl-3,3'-bis(sulfopropyl)-naphtho(1,2-d)thiacarbocyanine hydroxide and 9-ethyl-3,3'-bis(sulfobutyl)selenacarbocyanine hydroxide was applied onto the layer, and a protective gelatin layer was provided thereon to prepare a photographic material for making a printing plate.

A content screen (133 lines per 1 inch) was closely superposed on the thus prepared photographic material and optical wedge exposure to light was made. After development at 20° C. for 3 minutes using a developing solution having the following composition, the resulting sample was fixed, washed with water and dried according to usual methods.

| Composition of the developing solution | |
|---|---|
| Water | 500 ml |
| Anhydrous sodium sulfite | 30 g |
| Paraformaldehyde | 7.5 g |
| Sodium bisulfite | 2.2 g |
| Boric acid | 7.5 g |
| Hydroquinone | 22.5 g |
| Potassium bromide | 1.6 g |
| Water to | 1 l |

Background contamination was scarcely observed in the unexposed area of the photographic material after the treatments. Further, a halftone dot image having an excellent edge gradient was obtained.

As is seen from the foregoing, the present invention provides new methine dyes for this technical field. These methine dyes can be used in place of known methine dyes in silver halide photographic light-sensitive materials.

Since methine dyes of the invention each exhibit absorption peaks in wavelength longer than that expected based on the number of methine groups in the chromophore, dyes having an absorption in a longer wavelength region can relatively readily be obtained according to the invention. Further, it is possible to give dyes either of sensitizing performances and desensitizing performances according to purpose by modifying structure thereof to adjust potential thereof.

What is claimed is:

1. A silver halide photographic light-sensitive material containing at least one methine dye which consists of an azulene nucleus, at least one of 10 carbon atoms of which is replaced by chalcogen atom(s) or nitrogen atom(s), and further whose 7-membered ring part is substituted with a methine bond having at the terminal an auxochrome which forms a conjugated resonance chromophore together with $10\pi$ electron system of the nucleus.

2. The silver halide photographic light-sensitive material of claim 1 wherein the carbon atom replaced by chalcogen atom(s) or nitrogen atom(s) is at least one of carbon atoms at the 1- and 3-positions of the azulene nucleus, and when both carbons at the 1- and 3-positions of the nucleus are replaced by hetero atoms, at least one of the hetero atoms is a nitrogen atom.

3. The silver halide photographic light-sensitive material of claim 2 wherein the methine dye is represented by the following general formula (I):

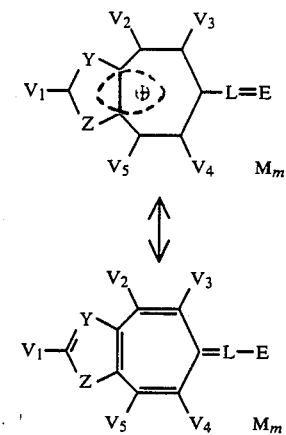

wherein

E represents an auxochrome; L represents a methine bond; $V_1$, $V_2$, $V_3$, $V_4$ and $V_5$ each represent hydrogen atoms, halogen atoms, substituted or unsubstituted alkyl groups, acyl groups, acyloxy groups, substituted or unsubstituted alkoxycarbonyl groups, substituted or unsubstituted carbamoyl groups, substituted or unsubstituted sulfamoyl groups, carboxyl groups, cyano groups, hydroxyl groups, amino groups, acylamino groups, substituted or unsubstituted alkoxy groups, alkylthio groups, alkylsulfonyl groups, sulfonic acid groups, or aryl groups, or alternatively two of $V_1$ to $V_5$ linking to adjacent carbon atoms may combine to form a condensed ring;

Y and Z each represent carbon atoms

wherein V has the same meaning with $V_1$, $V_2$, $V_3$, $V_4$ and $V_5$), chalcogen atoms or nitrogen atoms

wherein $R_1$ is in some occasion necessary for forming a nucleus and in the other occasion unnecessary, and when needed, represents a hydrogen atom, a substituted or unsubstituted alkyl group, a substituted or unsubstituted aryl group or a heterocyclic ring group), provided that Y and Z do not represent carbon atoms at the same time, further provided that when Y and Z are represented by chalcogen atoms or nitrogen atoms, at least one of them is a nitrogen atom, further provided that when one of Y and Z represents a chalcogen atom, and the other represents a carbon atom or a nitrogen atom, Z represents a chalcogen atom and Y represents a carbon atom or a nitrogen atom;

M represents a counter ion for charge balance, m is a number of 0 or more necessary for balance of charge; and bonding position of a methine bond L was representatively expressed as the 6-position in the formula (I), but may also be expressed as another position (4-, 5-, 7- or 8-position).

4. The silver halide photographic light-sensitive material of claim 3 wherein the methine dye is represented by one of the following formulae (II) to (IX):

General formula (II)

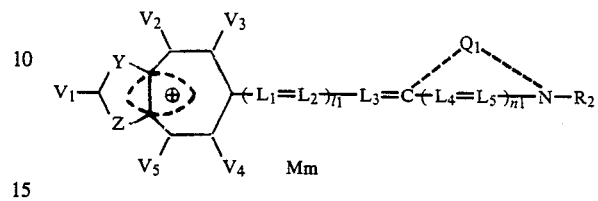

wherein $V_1$ to $V_5$, Y, Z, M and m have the same meanings as those in the general formula (I); position of the methine bond may be any of the 4-, 5-, 6-, 7- and 8-positions, as is in the general formula (I);

$Q_1$ represents an atomic group necessary for forming a 5- or 6-membered nitrogen-containing ring; $L_1$, $L_2$, $L_3$, $L_4$ and $L_5$ each represent methine groups which may optionally be substituted;

$R_2$ represents a substituted or unsubstituted alkyl group;

$l$ represents an integer of 0 to 3; and $n_1$ represents 0 or 1;

General formula (III)

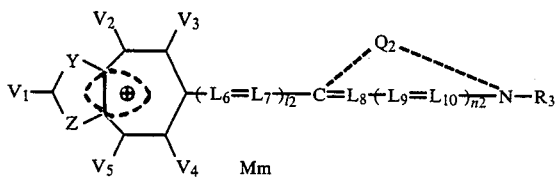

wherein $V_1$ to $V_5$, Y, Z, M and m have the same meanings as those in the general formula (I); position of the methine bond may be any of the 4-, 5-, 6-, 7- and 8-positions, as is in the general formula (I);

$Q_2$ represents an atomic group necessary for forming a 5- or 6-membered nitrogen-containing ring; $L_6$, $L_7$, $L_8$, $L_9$ and $L_{10}$ have the same meanings with $L_1$, $L_2$, $L_3$, $L_4$ and $L_5$;

$R_3$ represents a substituted or unsubstituted alkyl group;

$l_2$ represents an integer of 0 to 3; and $n_2$ represents 0 or 1;

General formula (IV)

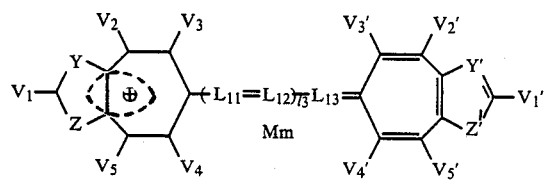

wherein $V_1$ to $V_5$, Y, Z, M and m have the same meanings as those in the general formula (I); Y' and Z' have the same meanings with Y and Z, respectively; position of the methine bond may be any of the 4-, 5-, 6-, 7- and 8-positions;

$V_1'$ to $V_5'$ have the same meanings with $V_1$ to $V_5$, respectively; $L_{11}$, $L_{12}$ and $L_{13}$ have the same meanings with $L_1$, $L_2$, $L_3$, $L_4$ and $L_5$; and $l_3$ represents an integer of 0 to 3;

General formula (V)

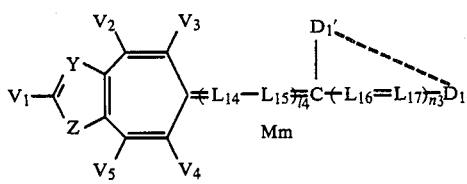

wherein $V_1$ to $V_5$, Y, Z, M and m have the same meanings as those in the general formula (I); position of the methine bond may be any of the 4-, 5-, 6-, 7- and 8-positions, as is in the general formula (I);

$D_1$ and $D_1'$ each represent atomic groups necessary for forming an acidic nucleus, and may be non-cyclic or cyclic;

$L_{14}$, $L_{15}$, $L_{16}$ and $L_{17}$ have the same meanings with $L_1$, $L_2$, $L_3$, $L_4$ and $L_5$; $l_4$ represents an integer of 0 to 3; and $n_3$ represents 0 or 1;

General formula (VI)

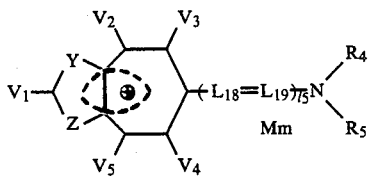

wherein $V_1$ to $V_5$, Y, Z, M and m have the same meanings as those in the general formula (I); position of the methine bond may be any of the 4-, 5-, 6-, 7- and 8-positions, as is in the general formula (I);

$R_4$ and $R_5$ represent substituents known in general tertiary amines, and $R_4$ and $R_5$ may combine to form a ring;

$L_{18}$ and $L_{19}$ have the same meanings with $L_1$, $L_2$, $L_3$, $L_4$ and $L_5$; and represents an integer of 0 to 3;

General formula (VII)

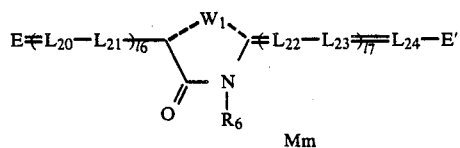

-continued $$E_1 = \left[ \begin{array}{c} \text{structure} \end{array} \right] \text{ or } \left[ \begin{array}{c} \text{structure} \end{array} \right]$$

$$E_2 = \left[ R_7-N^+ =\!\!=\!\!L_{25}-L_{26}\!\!=\!\!\!\overset{Q_3}{\underset{n_4}{\diagup\!\!\!\diagdown}}\!\!C- \right] \text{ or }$$

$$\left[ R_7-N + L_{25}=L_{26}\!\!\overset{Q_3}{\underset{n_4}{\diagup\!\!\!\diagdown}}\!\!C= \right]$$

wherein

E and E' each is $E_1$ or $E_2$, provided that at least one of E and E' is $E_1$;

$V_1$ to $V_5$, Y, Z, M and m have the same meanings as those in the general formula (I); position of the methine bond in $E_1$ may be any of the 4-, 5-, 6-, 7- and 8-positions, as is in the general formula (I);

$W_1$ represents an atomic group necessary for forming a 5- or 6-membered heterocyclic ring;

$R_6$ represents a hydrogen atom, a substituted or unsubstituted alkyl group, a substituted or unsubstituted aryl group or a heterocyclic group;

$Q_3$ and $R_7$ have the same meanings with $Q_1$ and $R_2$ in the general formula (II), respectively;

$L_{20}$, $L_{21}$, $L_{22}$, $L_{23}$, $L_{24}$, $L_{25}$ and $L_{26}$ have the same meanings with $L_1$, $L_2$, $L_3$, $L_4$ and $L_5$;

$l_6$ and $l_7$ are integers of 0 to 3; and $n_4$ is 0 or 1;

General formula (VIII)

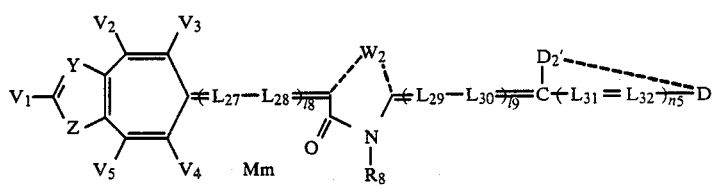

wherein $V_1$ to $V_5$, Y, Z, M and m have the same meanings as those in the general formula (I); position of the methine bond may be any of the 4-, 5-, 6-, 7- and 8-positions, as is in the general formula (I);

$W_2$ has the same meaning with $W_1$; $R_8$ has the same meaning with $R_6$;

$D_2$ and $D_2'$ have the same meanings with $D_1$ and $D_1'$ in the general formula (V), respectively;

$L_{27}$, $L_{28}$, $L_{29}$, $L_{30}$, $L_{31}$ and $L_{32}$ have the same meanings with $L_1$, $L_2$, $L_3$, $L_4$ and $L_5$;

$l_8$ and $l_9$ are integers of 0 to 3; and $n_5$ represents 0 or 1;

General formula (IXa)

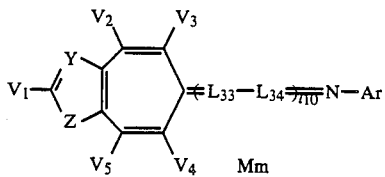

General formula (IXb)

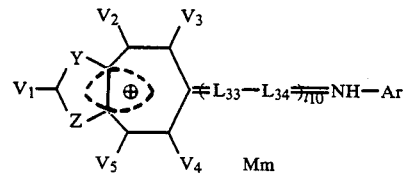

wherein $V_1$ to $V_5$, Y, Z, M and m have the same meanings as those in the general formula (I); position of the methine bond may be any of the 4-, 5-, 6- and 8-positions, as is in the general formula (I);

$L_{33}$ and $L_{34}$ have the same meanings with $L_1$, $L_2$, $L_3$, $L_4$ and $L_5$;

Ar represents an aromatic group; and $l_{10}$ represents an integer of 0 to 3.

5. The silver halide photographic light-sensitive material of claim 1 wherein the methine dye is contained as a sensitizing agent, a sensitizing dye, a desensitizing agent or a desensitizing dye in a silver halide light-sensitive layer.

6. The silver halide photographic light-sensitive material of claim 5 wherein the methine dye is contained in an amount of $5 \times 10^{-7}$ to $1 \times 10^{-2}$ moles per 1 mole of the silver halide.

7. The silver halide photographic light-sensitive material of claim 1 wherein the methine dye is contained as a filter dyestuff, an irradiation inhibiting dyestuff or an antihalation dyestuff in a silver halide light-sensitive layer, a filter layer, an antihalation layer, an intermediate layer, a protective layer and/or a back layer.

8. The silver halide photographic light-sensitive material of claim 7 wherein the methine dye is contained so that its optical density comes to a range of 0.05 to 3.0.

9. The silver halide photographic light-sensitive material of claim 1 wherein the silver halide is selected from silver bromide, silver iodobromide, silver iodochlorobromide, silver chlorobromide and silver chloride.

10. The silver halide photographic light-sensitive material of claim 1 wherein silver halide grains are grains which have different phases between the inner part and the surface layer, grains which are composed of a homogeneous phase through them, grains wherein latent images are mainly formed on the surface, grains wherein latent images are mainly formed inside the grains, or grains which previously fogged.

11. The silver halide photographic light-sensitive material of claim 1 wherein a cyan dye-forming coupler, a magenta dye-forming coupler and a yellow dye-forming coupler are contained.

* * * * *